(12) United States Patent
Johta et al.

(10) Patent No.: US 9,409,590 B2
(45) Date of Patent: Aug. 9, 2016

(54) STEERING DEVICE

(71) Applicant: NSK LTD., Tokyo (JP)

(72) Inventors: Masaya Johta, Gunma (JP); Hideki Kojima, Gunma (JP); Wataru Hagiwara, Gunma (JP); Daiki Orihara, Gunma (JP); Ryoichi Suzuki, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/655,799

(22) PCT Filed: Oct. 17, 2014

(86) PCT No.: PCT/JP2014/077731
§ 371 (c)(1),
(2) Date: Jun. 26, 2015

(87) PCT Pub. No.: WO2015/064395
PCT Pub. Date: May 7, 2015

(65) Prior Publication Data
US 2015/0344062 A1   Dec. 3, 2015

(30) Foreign Application Priority Data

Oct. 30, 2013 (JP) ................. 2013-225851
Dec. 17, 2013 (JP) ................. 2013-260160
Jun. 27, 2014 (JP) ................. 2014-132132
Jul. 25, 2014 (JP) ................. 2014-151310

(51) Int. Cl.
*B62D 1/187* (2006.01)
*B62D 1/184* (2006.01)
*B62D 1/19* (2006.01)

(52) U.S. Cl.
CPC ............... *B62D 1/187* (2013.01); *B62D 1/184* (2013.01); *B62D 1/195* (2013.01)

(58) Field of Classification Search
CPC ......... B62D 1/187; B62D 1/184; B62D 1/195
See application file for complete search history.

(56) References Cited

U.S. PATENT DOCUMENTS

2001/0019205 A1   9/2001   Ikeda et al.
2007/0068311 A1   3/2007   Shimoda et al.
(Continued)

FOREIGN PATENT DOCUMENTS

JP   2002-120731 A   4/2002
JP   2002-160646 A   6/2002
(Continued)

OTHER PUBLICATIONS

International Search Report of PCT/JP2014/077731, dated Jan. 20, 2015. [PCT/ISA/210].

*Primary Examiner* — Faye M Fleming
(74) *Attorney, Agent, or Firm* — Sughrue Mion, PLLC

(57) ABSTRACT

A steering device which slides when an impulse load is applied. The steering device includes an inner column having a cylindrical shape and a first hole opened therein, an outer column having a slit, an outer column bracket to tighten the outer column, an inner column bracket having a second hole opened therein, and a connection member provided at a position straddling the first hole and the second hole and detachably connecting the inner column and the inner column bracket. The telescopic friction plates are disposed at both sides of the outer column. The inner column bracket includes an arm portion connecting the telescopic friction plates disposed at both sides of the outer column, a neck portion projected from the arm portion, and a leg portion provided at an end opposite to the arm portion of the neck portion and contacting the inner column.

6 Claims, 35 Drawing Sheets

(56) References Cited

U.S. PATENT DOCUMENTS

| | | | |
|---|---|---|---|
| 2013/0213174 A1* | 8/2013 | Suzuki | B62D 1/187 74/493 |
| 2015/0239490 A1* | 8/2015 | Sakata | B62D 1/195 74/493 |
| 2015/0266495 A1* | 9/2015 | Yoshihara | B62D 1/195 74/493 |
| 2015/0266496 A1* | 9/2015 | Yoshihara | B62D 1/195 74/493 |
| 2015/0266497 A1* | 9/2015 | Yoshihara | B62D 1/184 74/493 |
| 2015/0353123 A1* | 12/2015 | Jyota | B62D 1/187 74/493 |

FOREIGN PATENT DOCUMENTS

| | | |
|---|---|---|
| JP | 2005-138758 A | 6/2005 |
| JP | 2007-69800 A | 3/2007 |
| JP | 2008-195180 A | 8/2008 |
| JP | 2009-29152 A | 2/2009 |

* cited by examiner

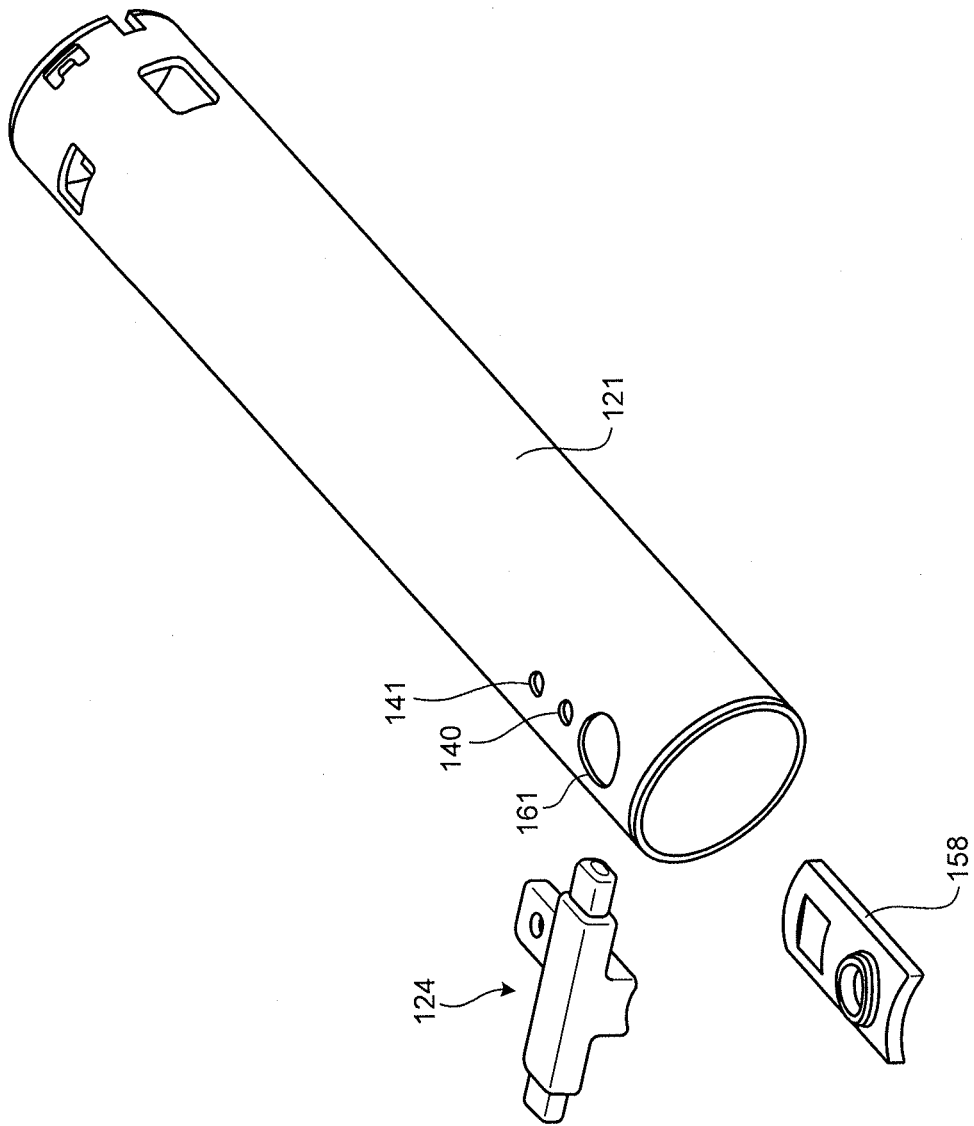

STEERING DEVICE

CROSS REFERENCE TO RELATED APPLICATIONS

This application is a National Stage of International Application No. PCT/JP2014/077731 filed Oct. 17, 2014, claiming priorities based on Japanese Patent Application Nos. 2013-225851, filed Oct. 30, 2013, 2013-260160, filed Dec. 17, 2013, 2014-132132, filed Jun. 27, 2014, and 2014-151310, filed Jul. 25, 2014, the contents of all of which are incorporated herein by reference in their entirety.

BACKGROUND OF THE INVENTION

1. Field of the Invention

The present invention relates to a steering device.

2. Description of the Related Art

As a structure for supporting a steering device that gives a rudder angle to a vehicle wheel with the rotation of a steering wheel, a technique using a capsule is widely known. For example, in a technique disclosed in Prior Art 1, when an excessive load is applied to a steering column attached to a vehicle body through a capsule so that the steering column is pressed toward the front side of the vehicle body, a part of the capsule is cut so that the steering column moves toward the front side of the vehicle body, and hence a driver (an operator) is protected from the upthrust (secondary collision) of the steering wheel. Meanwhile, Prior Art 2 discloses a structure in which a telescopic fixed member slides due to an impact load. In this structure, since the fixed member is inserted into a groove, there is a need to lengthen the groove in order to take a large stroke amount. As a result, there is a tendency that the column increases in size.

PRIOR ART

Prior Art 1: Japanese Laid-open Patent Publication No. 2007-69800

Prior Art 2: Japanese Laid-open Patent Publication No. 2009-29152

As in the technique disclosed in Prior Art 1 in which the steering column is attached to the vehicle body through the capsule, the steering column is dropped when the capsule is cut. For this reason, when a setting value for a separation load in which the steering column moves toward the front side of the vehicle body is decreased in order to protect an operator having a light weight from the secondary collision, the steering column easily is dropped due to an erroneous operation. When the steering column is dropped due to the erroneous operation, it is difficult to perform the steering operation later. For this reason, it is difficult to decrease the setting value for the separation load.

The invention is made in view of the above-described circumstances, and an object of the invention is to provide a steering device capable of suppressing a problem in which a steering column is dropped by an erroneous operation is decreased even when a setting value of a separation load in which the steering column moves toward the front side of a vehicle body.

SUMMARY OF THE INVENTION

It is an object of the present invention to at least partially solve the problems in the conventional technology. According to an aspect of the invention, a steering device includes an inner column having a cylindrical shape and a first hole opened therein, the inner column rotatably supporting an input shaft connected to a steering wheel; an outer column having a cylindrical shape into which at least a part of the inner column is inserted and having a slit formed by notching one insertion side end of the inner column; an outer column bracket fixed to a vehicle body side member so as to support the outer column and to tighten the outer column along with telescopic friction plates having a plate shape; an inner column bracket having a second hole opened therein, the inner column supported by the telescopic friction plate; and a connection member provided at a position straddling the first hole and the second hole, and the connection member detachably connecting the inner column and the inner column bracket to each other. Each of the telescopic friction plates are disposed at both sides of the outer column, and the inner column bracket includes an arm portion connecting the telescopic friction plates disposed at both sides of the outer column, a neck portion projected from the arm portion in a direction perpendicular to the length direction of the arm portion, and a leg portion provided at an end opposite to the arm portion of the neck portion and contacting the inner column.

Accordingly, in a steering device according to the invention, when an excessive load is applied to a steering wheel, the load is transmitted to an inner column through an input shaft, and hence the inner column is moved forward. Meanwhile, an inner column bracket which is supported by a telescopic friction plate does not move. For this reason, since a shearing force is applied to a connection member, the connection member is cut when the load exceeds the allowable shearing force of the connection member. When the connection member is cut, the connection between the inner column and the inner column bracket is released. When the connection between the inner column and the inner column bracket is released, the inner column is supported in the axial direction by a friction force generated between the inner column and an outer column. For this reason, the inner column of the steering column may move toward the front side of the vehicle. Further, even when the connection member is cut, the outer column is supported by an outer column bracket fixed to a vehicle body side member. Further, the inner column is supported by the outer column. For this reason, even when the connection member is cut, the steering column does not drop. Thus, the steering device according to the invention may prevent a problem in which the steering column drops by an erroneous operation even when a setting value of a separation load, in which the steering column moves toward the front side of the vehicle, is decreased.

Further, when an axial load is applied to the inner column bracket, a tightening force is applied from both sides of the outer column to the inner column bracket. For this reason, it is possible to stabilize the posture of the inner column bracket when the connection member is cut. Thus, when the inner column starts to move, a posture of the inner column is maintained to be straight in the axial direction. Thus, since the inner column is likely to move straight in the axial direction, it is possible to prevent a problem where the movement of the inner column is disturbed or a problem where a friction force generated between the inner column and the outer column becomes larger than a predetermined value.

The arm portion includes a curved portion which is curved in a direction approaching the inner column at a position between the neck portion and the telescopic friction plate. Accordingly, a bonding portion between the arm portion and the telescopic friction plate is located near the inner column. For this reason, the distance, in a direction perpendicular to the axial direction of the inner column, from the bonding portion between the arm portion and the telescopic friction plate to the cut surface used for cutting the connection member is shortened. Thus, since a moment force is prevented from being applied to the inner column bracket when the connection member is cut, it is possible to stabilize the posture of the inner column bracket when the connection member is cut.

The arm portion includes a rib that is projected in a direction perpendicular to an axial direction of the inner column. Accordingly, the rigidity of the arm portion is improved. For this reason, even when a moment force is applied to the inner column bracket, the deformation of the inner column bracket is suppressed. Thus, it is possible to stabilize the posture of the inner column bracket when the connection member is cut.

The leg portion is provided at the front and rear sides of the neck portion in an axial direction of the inner column, and the first hole and the second hole are provided at front and rear sides of the neck portion in an axial direction of the inner column. Accordingly, since the distance from the bonding portion between the inner column bracket and the telescopic friction plate to the cut surface used for cutting the connection member is extremely short even when the axial load is applied to the inner column bracket, the moment force applied to the inner column bracket decreases. For this reason, the connection member is cut while the posture of the inner column bracket is stabilized.

Each of the telescopic friction plates disposed at both sides of the outer column faces each other with the inner column bracket interposed between the telescopic friction plates, and the first hole and the second hole are disposed at a position where the distance values from each of the telescopic friction plates facing each other with the inner column bracket interposed between the telescopic friction plates are equal to each other. Accordingly, since a stable tightening force is applied from both sides of the outer column to the inner column bracket when the axial load is applied to the inner column bracket, it is possible to stabilize the posture of the inner column bracket when the connection member is cut. Thus, when the inner column starts to move, a posture of the inner column is maintained to be straight in the axial direction. Thus, since the inner column is likely to move straight in the axial direction, it is possible to prevent a problem in which the movement of the inner column is disturbed or a problem in which a friction force generated between the inner column and the outer column becomes larger than a predetermined value.

The outer column is located at a front side of a vehicle body and includes a pivot bracket, and the outer column is formed so that the detached inner column is inserted into the outer column. Accordingly, the axial direction of the outer column may be aligned to the axial direction of the inner column. For this reason, the outer column may easily guide the inner column when the inner column moves in the axial direction. Thus, since the inner column moves easily straight in the axial direction, it is possible to suppress a problem in which the movement of the inner column is disturbed or a problem in which a friction force generated between the inner column and the outer column becomes larger than a predetermined value.

According to the invention, even when a setting value of a separation load, in which the steering column moves toward the front side of a vehicle body, is decreased, it is possible to provide a steering device capable of suppressing a problem where a steering column is dropped by an erroneous operation.

BRIEF DESCRIPTION OF THE DRAWINGS

FIG. 22 is a diagram illustrating an inner plate attachment method according to the third embodiment.

DETAILED DESCRIPTION OF THE PREFERRED EMBODIMENT

A mode (an embodiment) for carrying out the invention will be described in detail with reference to the drawings. The invention is not limited to the content described in the embodiments below. Further, components described below include a component which is easily supposed by the person skilled in the art and a component which has substantially the same configuration. Further, the components described below may be appropriately combined with one another.

First to Fourth Embodiments

Figure 1:
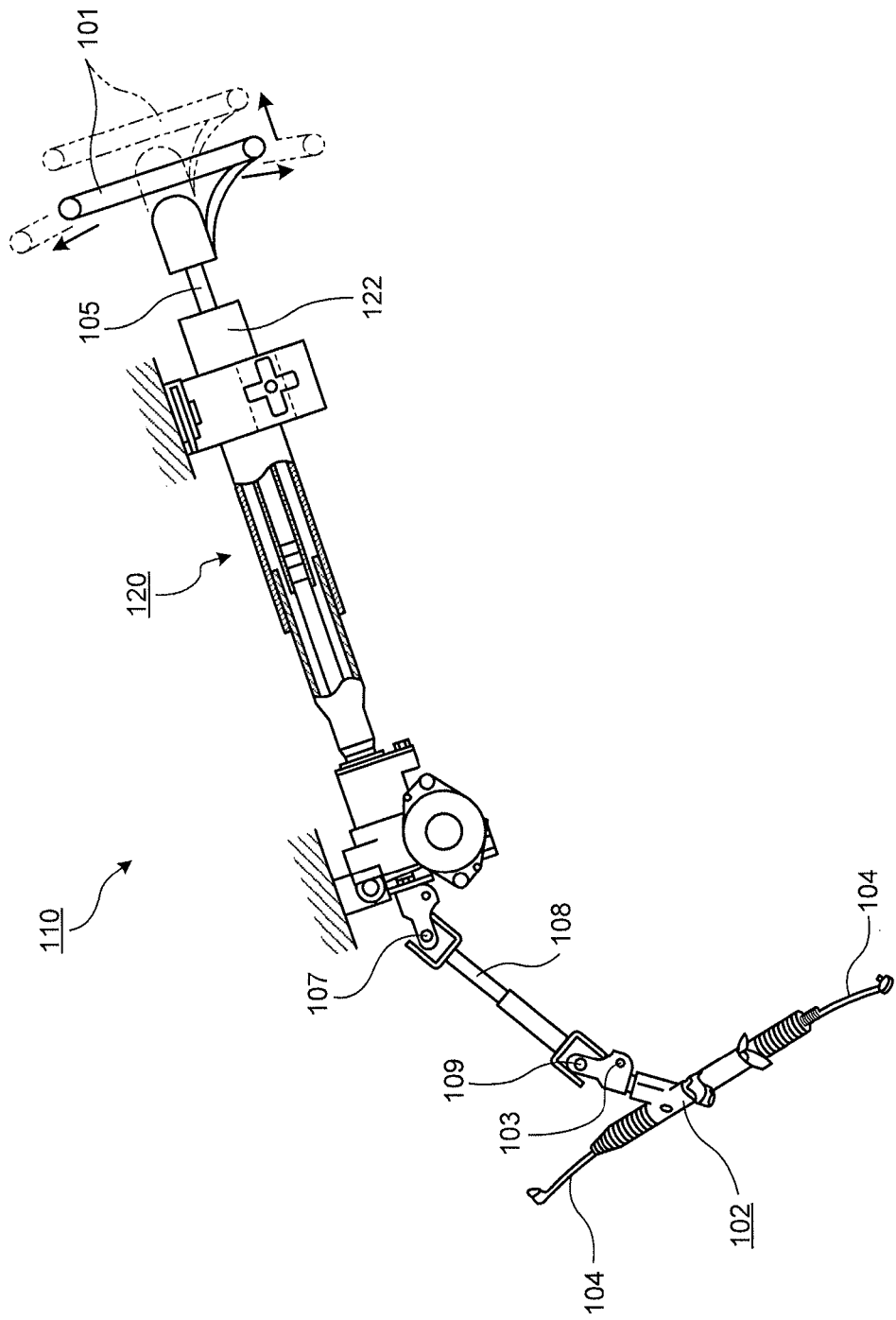
FIG. 1 is a schematic diagram illustrating an entire steering device of first to fourth embodiments.
Figure 2:
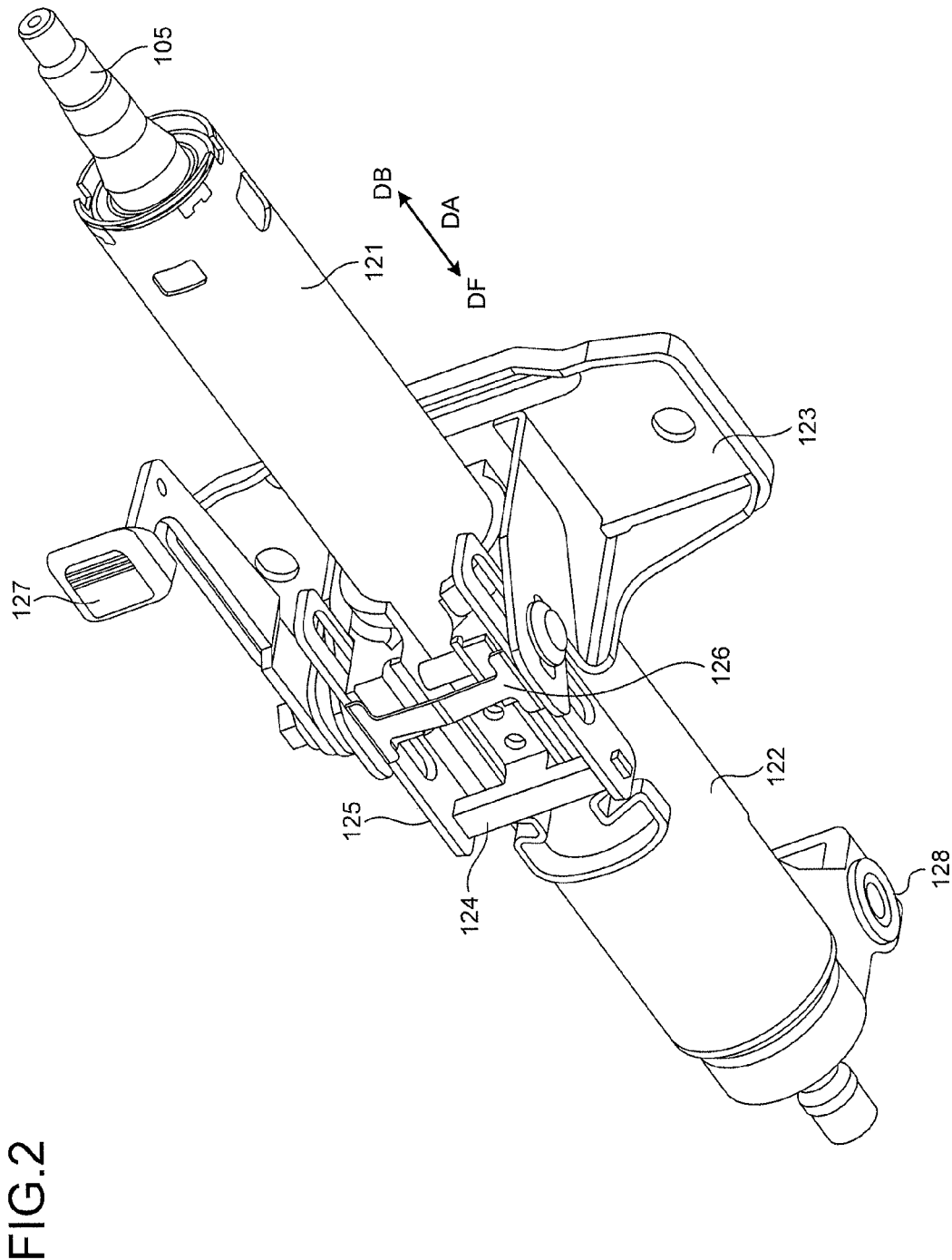
FIG. 2 is a perspective view illustrating a steering column apparatus of the steering device of the first to fourth embodiments.
Figure 3:
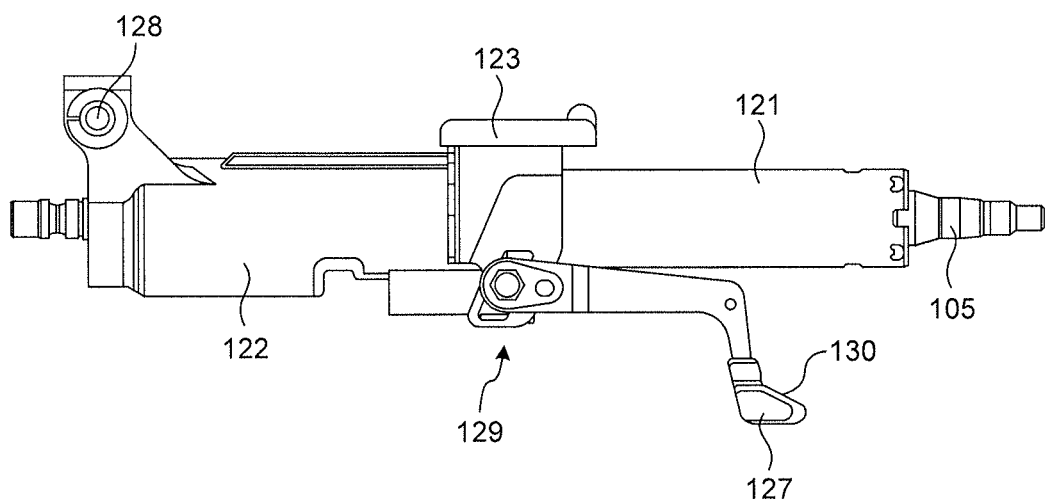
FIG. 3 is a diagram illustrating a side surface of the steering column apparatus according to the first to fourth embodiments.
Figure 4:
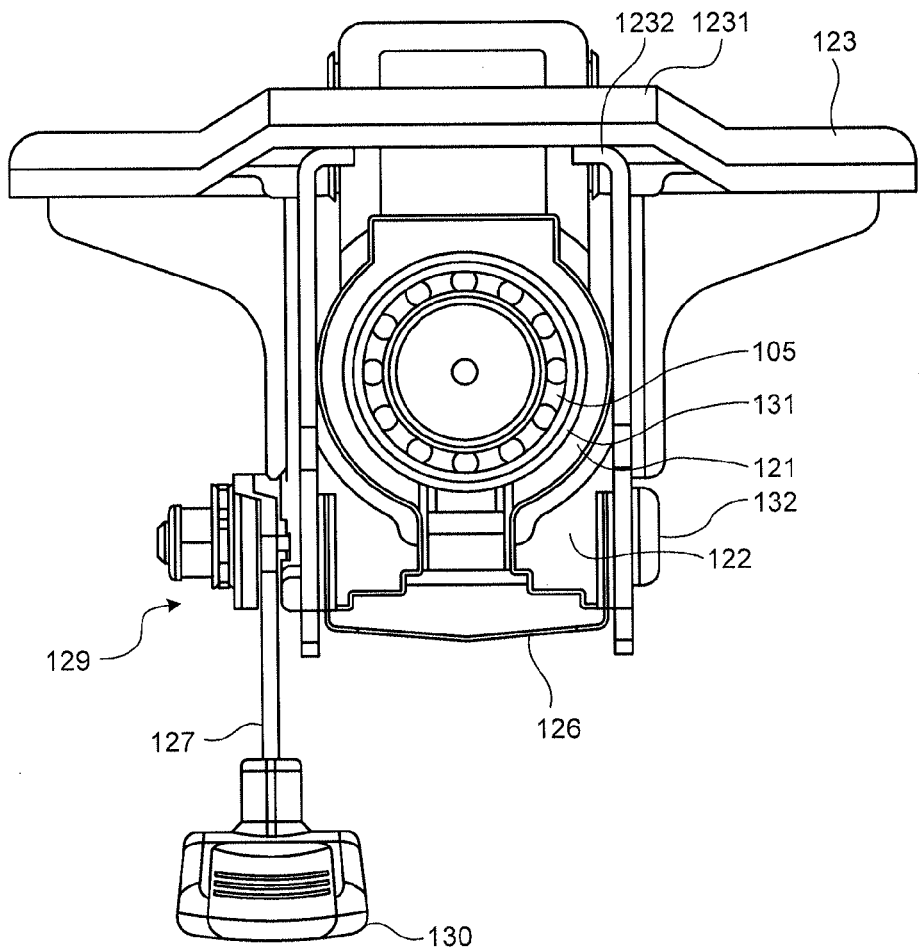
FIG. 4 is a diagram illustrating a front surface (at the rear side) of the steering column apparatus according to the first to fourth embodiments.
Figure 5:
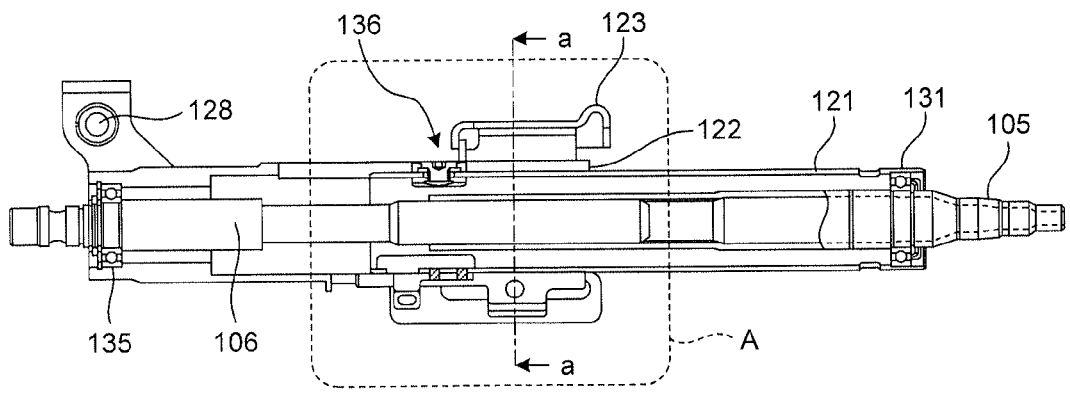
FIG. 5 is a diagram illustrating a side surface (a part of a cross section) of the steering column apparatus according to the first embodiment.
Figure 6:
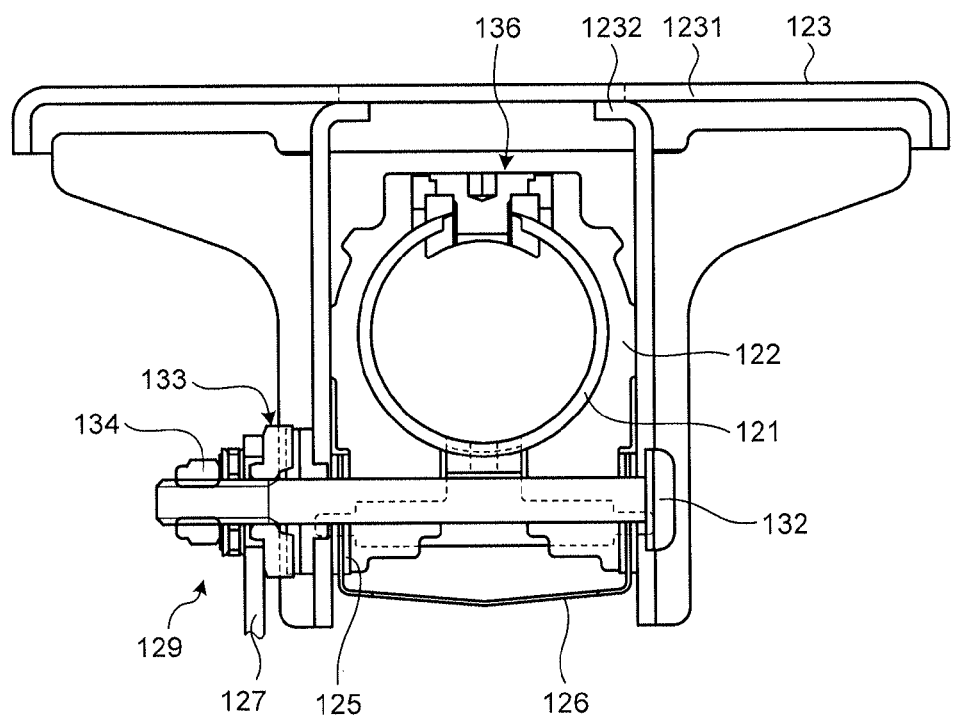
FIG. 6 is a cross-sectional view taken along the line a-a of FIG. 5.
Figure 7:
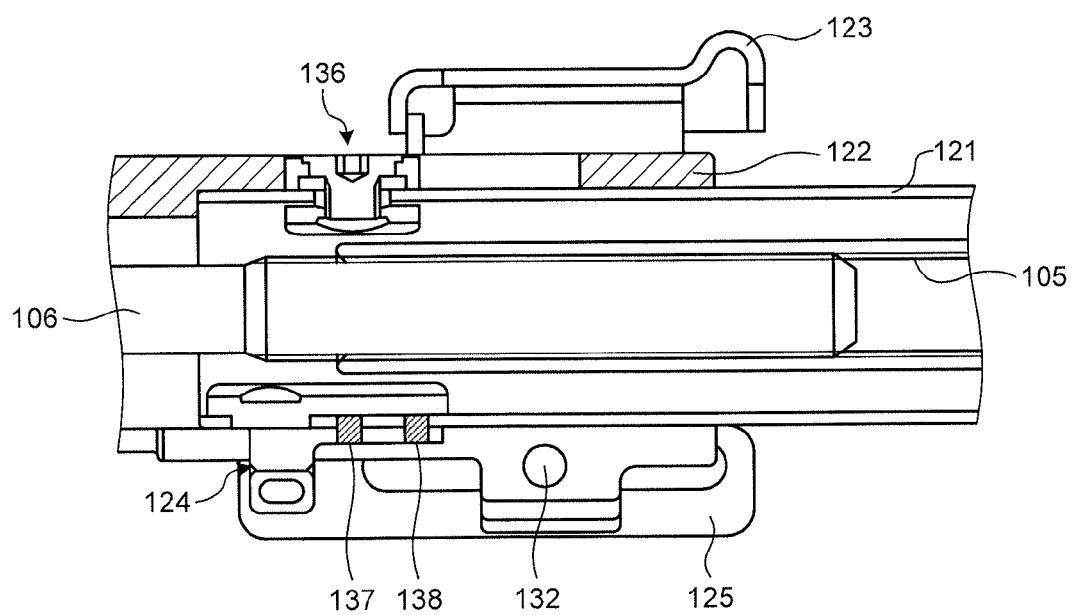
FIG. 7 is an enlarged diagram illustrating a part A of FIG. 5.

Hereinafter, this structure will be described in detail with reference to FIGS. 1 to 23. FIGS. 1 to 4 schematically illustrate the first to fourth embodiments. FIGS. 5 to 10 specifically illustrate the structure of the first embodiment. Similarly, FIGS. 11 to 15 specifically illustrate the structure of the second embodiment, and FIGS. 16 to 23 specifically illustrate the structure of the third embodiment. In FIG. 2, the axial direction DA indicates the axial direction of the steering shaft, and the front side DF and the rear side DB indicate the front side and the rear side of the vehicle body when the steering device is attached to the vehicle body.

The first embodiment relates to a steering column apparatus 120 that supports a steering shaft including a male steering shaft 106 and a female steering shaft 105. Here, a steering column includes an inner column 121 and an outer column 122 and contracts in the axial direction to be adjusted in a telescopic manner and to absorb impact. The steering column may be tilted through a tilt bracket 123 attached to a vehicle body. Then, a tightening mechanism 129, provided in the tilt bracket 123, tightens the outer column 122 so as to hold the inner column 121. Here, a telescopic multi-plate 125 is provided so as to increase the friction surface of the tightening mechanism 129. The telescopic multi-plate 125 is fixed to a fixed bracket 124 provided in a slit of the outer column 122 at the bottom surface side of the column (121, 122), and a shear pin is inserted through a hole of the inner column 121 and a hole of the fixed bracket 124 while the holes match each other, thereby the inner column 121 is detachably supported by the fixed bracket 124.

The second embodiment relates to the steering column apparatus 120 that supports the steering shaft including the male steering shaft 106 and the female steering shaft 105. Here, the steering column apparatus 120 includes the inner column 121 and the outer column 122 and contracts in the axial direction to be operated in a telescopic manner and to absorb impact. The steering column apparatus 120 is attached to the vehicle body so as to be tilted through the tilt bracket 123 attached to the vehicle body. Further, the tilt bracket 123 includes the tightening mechanism 129 which holds the inner column 121 by tightening the outer column 122. The outer column 122 includes a slit, and the inner column 121 is gripped by a pressing bracket 1232 which presses the inner column by the action of the tightening mechanism 129 in the right and left direction of the slit. Furthermore, a cam and gear mechanism 148 serving as a fixed plate detachably attached to the inner column 121 is disposed in the slit, and the tightening mechanism 129 is provided which presses a cam portion provided in a tilt bolt center portion 153 in a direction from the downside of the fixed plate toward the upside thereof by rotating a cam lock mechanism 133, as a cam at the center of a tilt lever 127, with the rotation of the tilt lever constituting the tightening mechanism.

The third embodiment relates to a steering column apparatus that supports a steering shaft. Here, the steering column apparatus includes an inner column and an outer column and contracts in the axial direction so as to be adjusted in a telescopic manner and to absorb impact. The steering column apparatus includes a tilt bracket provided in a vehicle body, and is attached to the vehicle body in a tiltable state. Then, the tilt bracket, the outer column, and a telescopic multi-plate as a friction plate are tightened by a tightening mechanism so as to hold the inner column fitted into the outer column. Further, the outer column includes a slit, and the inner column is gripped by a pressing bracket which presses the inner column in the right and left direction of the slit in the tightening mechanism. Furthermore, an inner plate 158, which is a fixed plate as a friction plate detachably attached to the inner column, is disposed in the slit, and the fixed bracket which fixes the friction plate is coupled and fixed to the inner column by shear pins 137 and 138 formed by an injection-molding process.

The fourth embodiment relates to a steering device that includes the steering column apparatus according to any one of the first to third embodiments.

The steering device of the fourth embodiment may be appropriately used as a vehicle steering device.

Fifth Embodiment

Figure 24:
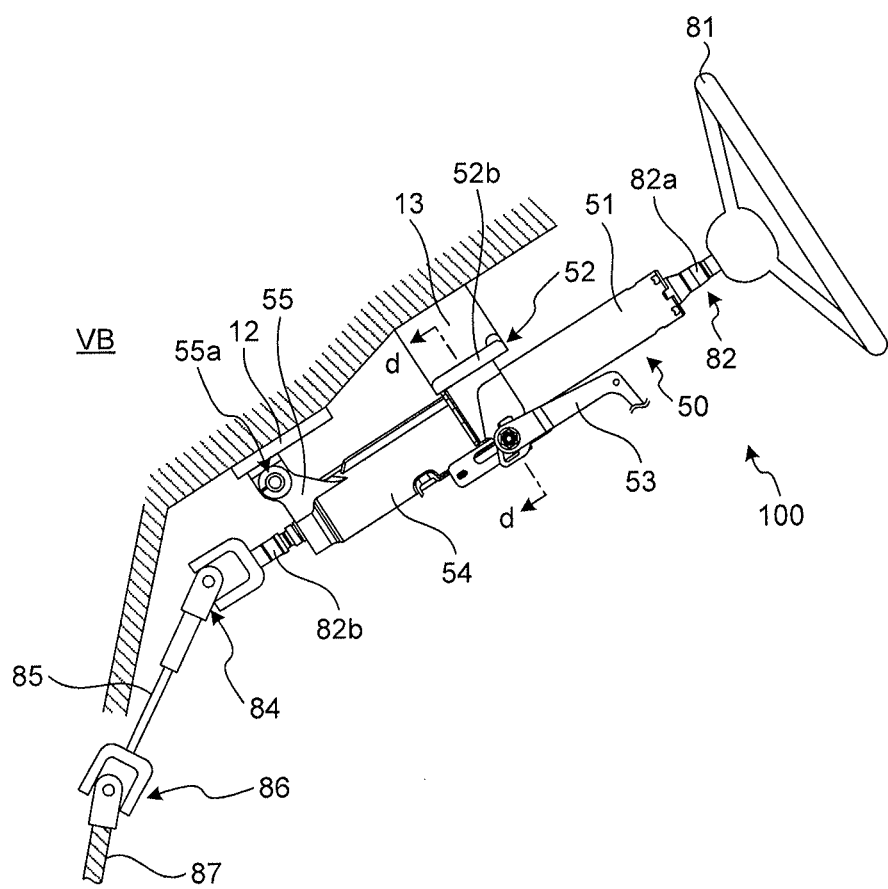
FIG. 24 is a schematic diagram illustrating the periphery of a steering device according to a fifth embodiment.
Figure 25:
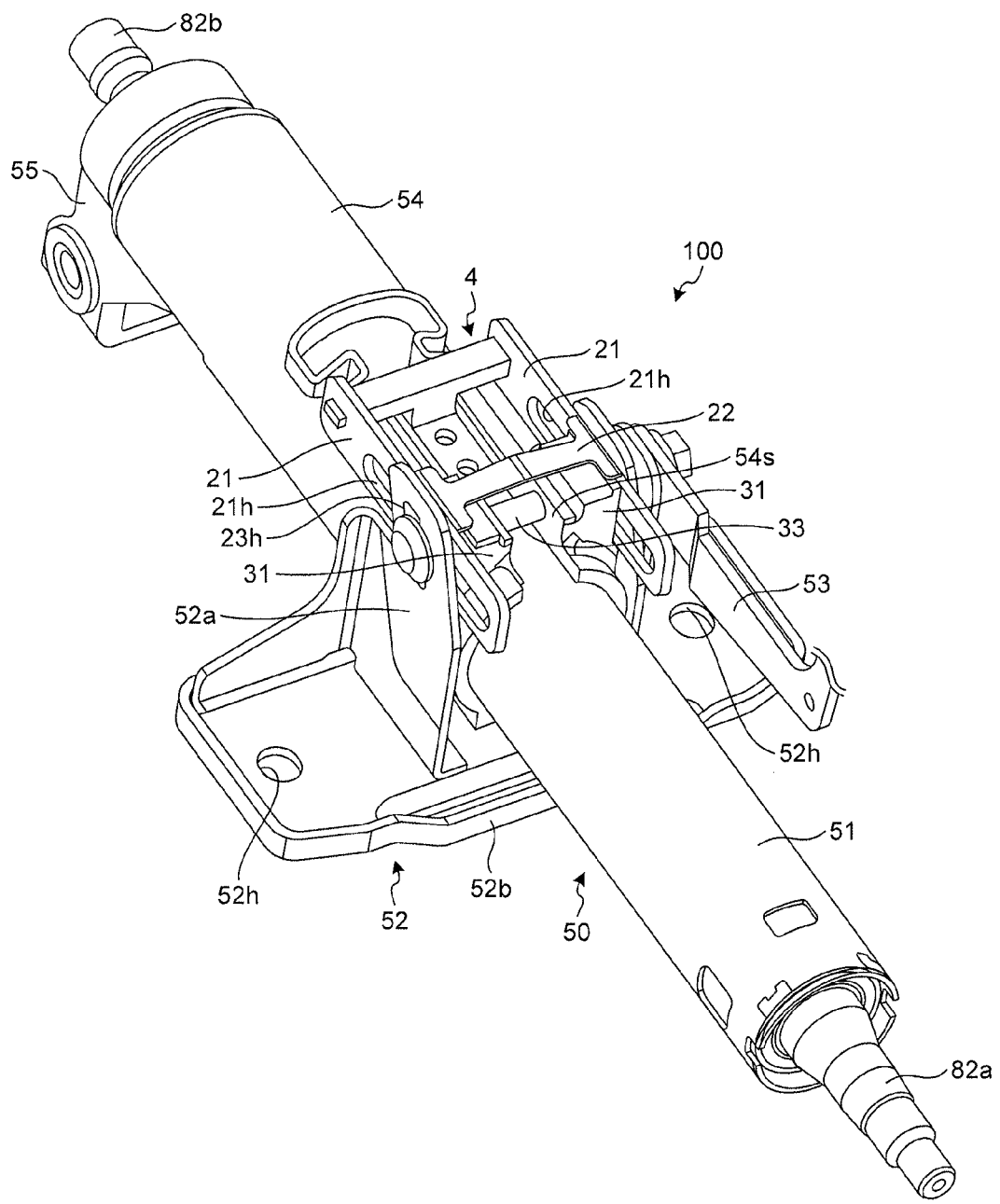
FIG. 25 is a perspective view illustrating the steering device according to the fifth embodiment when viewed from a bottom surface.

FIG. 24 is a schematic diagram illustrating the periphery of a steering device according to a fifth embodiment. FIG. 25 is a perspective view illustrating the steering device according to the fifth embodiment when viewed from the bottom surface thereof. Referring to FIGS. 24 and 25, an outline of the steering device according to the fifth embodiment will be described. Further, in the description below, it is assumed that the front side of a vehicle body VB when a steering device 100 is attached to the vehicle body VB will be simply referred to as the front side and the rear side of the vehicle body VB when the steering device 100 is attached to the vehicle body VB will be simply referred to as the rear side. In FIG. 24, the front side indicates the left side of the drawing, and the rear side indicates the right side of the drawing.

(Steering Device)

The steering device 100 includes a steering wheel 81, a steering shaft 82, a universal joint 84, a lower shaft 85, and a universal joint 86 in order in which a force is transmitted from an operator, and is coupled to a pinion shaft 87.

The steering shaft 82 includes an input shaft 82a and an output shaft 82b. In the input shaft 82a, one end is connected to the steering wheel 81 and the other end is connected to the output shaft 82b. In the output shaft 82b, one end is connected to the input shaft 82a and the other end is connected to the universal joint 84. In the fifth embodiment, the input shaft 82a and the output shaft 82b are formed of general steel such as SPCC (Steel Plate Cold Commercial).

In the lower shaft 85, one end is connected to the universal joint 84 and the other end is connected to the universal joint 86. In the pinion shaft 87, one end is connected to the universal joint 86.

Further, the steering device 100 includes a steering column 50 including a cylindrical inner column 51 which supports the input shaft 82a rotatably, and a cylindrical outer column 54 into which at least a part of the inner column 51 is inserted. The inner column 51 is disposed at the rear side of the outer column 54. In the description below, the axial direction of the inner column 51 and the axial direction of the outer column 54 will be simply referred to as the axial direction.

The steering device 100 includes an outer column bracket 52 which is fixed to a vehicle body side member 13 and supports the outer column 54. The outer column bracket 52 includes an attachment plate portion 52b which is fixed to the vehicle body side member 13 and a frame-shaped support portion 52a which is integrated with the attachment plate portion 52b. The attachment plate portion 52b of the outer column bracket 52 includes, for example, an attachment hole 52h, and is fixed to the vehicle body side member 13 by a fixed member such as a bolt and the attachment hole 52h. The frame-shaped support portion 52a of the outer column bracket 52 is disposed at both sides of the outer column 54 so as to tighten the outer column 54. Further, the frame-shaped support portion 52a is provided with a tilt adjustment hole 23h as an elongated hole which is long in the up and down direction of the vehicle body VB.

Further, the outer column 54 includes a pivot bracket 55 which is provided at the front end. The pivot bracket 55 is supported by the vehicle body side member 12 so as to be rotatable about the center of a rotation shaft 55a. The rotation shaft 55a is parallel to, for example, the horizontal direction. Accordingly, the outer column 54 is supported so as to be tilted in the vertical direction.

Figure 26:
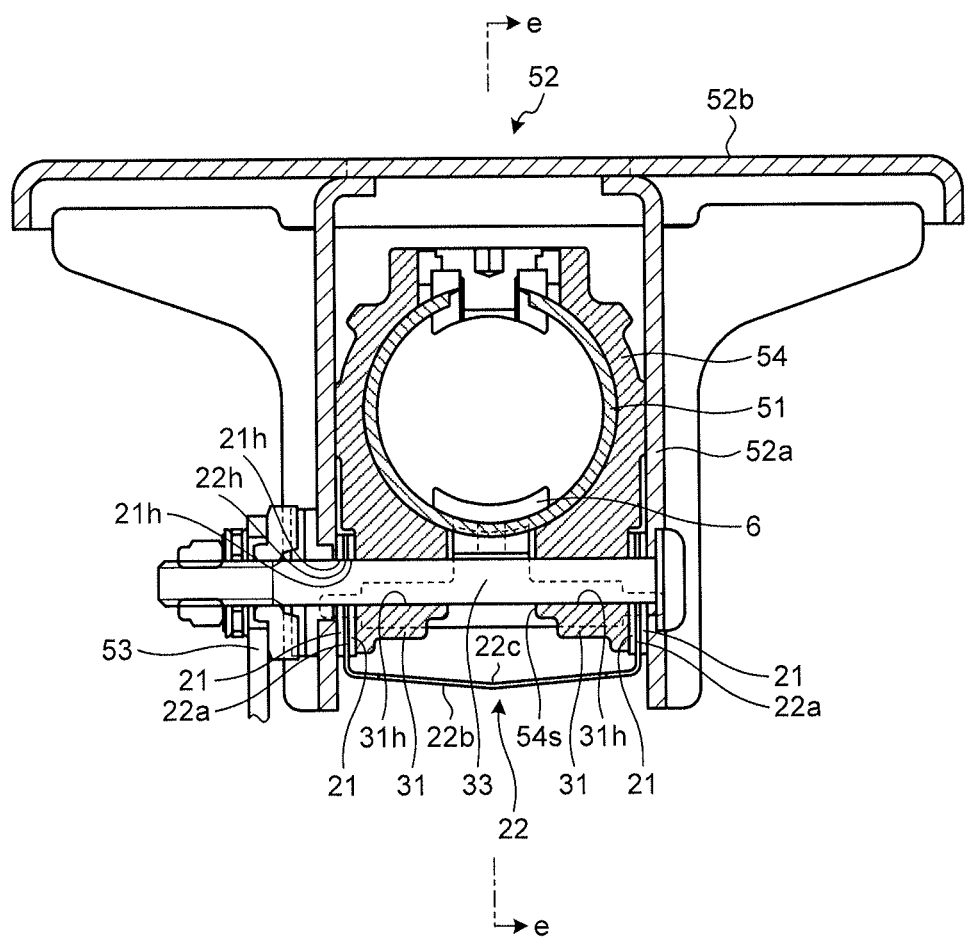
FIG. 26 is a cross-sectional view taken along the line d-d of FIG. 24.
Figure 27:
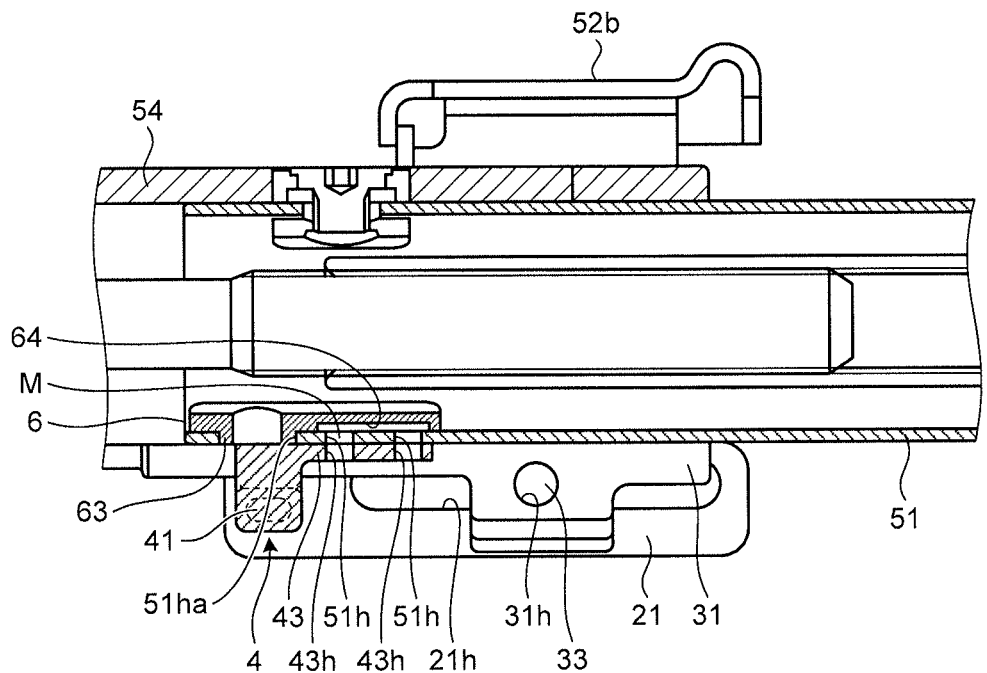
FIG. 27 is a cross-sectional view taken along the line e-e of FIG. 26.
Figure 28:
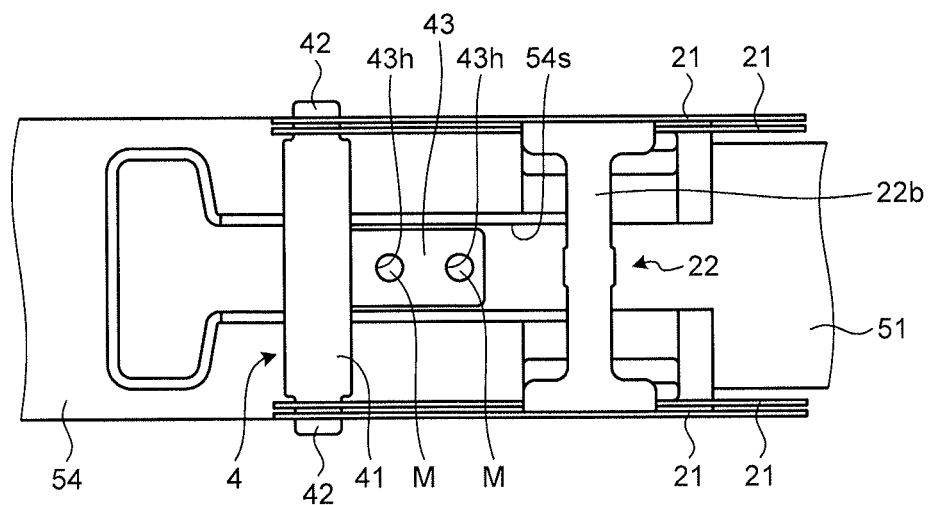
FIG. 28 is a diagram illustrating the bottom surface of the steering device according to the fifth embodiment.

FIG. 26 is a cross-sectional view taken along the line d-d of FIG. 24. FIG. 27 is a cross-sectional view taken along the line e-e of FIG. 26. FIG. 28 is a diagram illustrating the bottom surface of the steering device according to the fifth embodiment. As illustrated in FIG. 26, the outer column 54 includes two rod penetration holes 31 and a slit 54s. The rod penetration hole 31 is a portion which protrudes outward in the radial direction from the outer periphery surface of the inner column 51, and includes a rod penetration hole 31h as an annular hole as illustrated in FIG. 27. The radial direction indicates a direction perpendicular to the axial direction, and is used as the same meaning in the description below. The rod penetration holes 31h of two rod penetration holes 31 face each other in the radial direction. Further, a part of the rod penetration hole 31 faces the frame-shaped support portion 52a. A rod 33 is connected to a manipulation lever 53 while penetrating two rod penetration holes 31h and the tilt adjustment hole 23h of the frame-shaped support portion 52a.

Further, the slit 54s is an elongated hole which is formed by notching one insertion side end of the inner column 51, and is provided in the outer wall of the outer column 54 at a position between two rod penetration holes 31. Since the outer column 54 includes the slit 54s, the inner diameter decreases when the outer column is tightened. Accordingly, in a state where the outer column 54 is tightened, the outer column 54 is located at a portion covering the inner column 51, and the inner periphery surface of the outer column 54 contacts the outer periphery surface of the inner column 51. For this reason, a friction force is generated between the outer column 54 and the inner column 51. Further, both ends of the slit 54s in the axial direction may be blocked. That is, the slit 54s may be a closed structure.

As illustrated in FIG. 26, the steering device 100 includes a first telescopic friction plate 21 and a second telescopic friction plate 22. The first telescopic friction plate 21 is a plate-shaped member that includes a telescopic adjustment hole 21h as an elongated hole which is long in the axial direction. For example, two first telescopic friction plates 21 are disposed between the frame-shaped support portion 52a and the rod penetration hole 31 in an overlapping state. The second telescopic friction plate 22 is, for example, a member that is formed by bending a plate material, and substantially has a U-shape when viewed from the axial direction. The second telescopic friction plate 22 includes two friction portions 22a which are disposed between two first telescopic friction plates 21, a connection portion 22b which connects two friction portions 22a, and a curved portion 22c which is provided in the connection portion 22b. In addition, the first telescopic friction plate 21 may not be essentially disposed between the frame-shaped support portion 52a and the rod penetration hole 31, and may be disposed with the frame-shaped support portion 52a interposed between the first telescopic friction plate 21 and the rod penetration hole 31.

The friction portion 22a includes a rod penetration hole 22h as an annular hole. The rod 33 penetrates the telescopic adjustment hole 21h and the rod penetration hole 22h. The connection portion 22b is used to integrally connect two friction portions 22a, and hence the friction portions 22a may be easily disposed between two first telescopic friction plates 21. Further, the connection portion 22b may be maintained in a droopy state due to the curved portion 22c. Accordingly, the connection portion 22b may not easily pull the friction portions 22a even when the tightening state of the outer column bracket 52 changes so that the distance between two friction portions 22a changes. For this reason, it is possible to suppress a problem in which the friction portions 22a are pulled by the connection portion 22b so that a gap is formed between the friction portion 22a and the first telescopic friction plate 21.

When the frame-shaped support portion 52a is tightened, the first telescopic friction plate 21 and the friction portion 22a of the second telescopic friction plate 22 are pressed against the rod penetration hole 31 of the outer column 54 by the frame-shaped support portion 52a. Accordingly, a friction force is generated between the frame-shaped support portion 52a and the first telescopic friction plate 21, a friction force is generated between the first telescopic friction plate 21 and the friction portion 22a of the second telescopic friction plate 22, and a friction force is generated between the first telescopic friction plate 21 and the rod penetration hole 31. For this reason, the surface area causing a friction force increases compared to the case where the first telescopic friction plate 21 and the second telescopic friction plate 22 are not provided. The frame-shaped support portion 52a may more strongly tighten the outer column 54 by the first telescopic friction plate 21 and the second telescopic friction plate 22.

Further, when the manipulation lever 53 is rotated, the tightening force for the frame-shaped support portion 52a may be loosened, and the friction force between the frame-shaped support portion 52a and the outer column 54 disappears or decreases. Accordingly, the tilt position of the outer column 54 may be adjusted. Further, when the manipulation lever 53 is rotated, the tightening force for the frame-shaped support portion 52a may be loosened, and hence the width of the slit 54s of the outer column 54 increases. Accordingly, since the force in which the outer column 54 tightens the inner column 51 disappears, the friction force caused by the sliding of the inner column 51 disappears. Accordingly, an operator may adjust the telescopic position by pressing and pulling the inner column 51 through the steering wheel 81 after rotating the manipulation lever 53.

Figure 29:
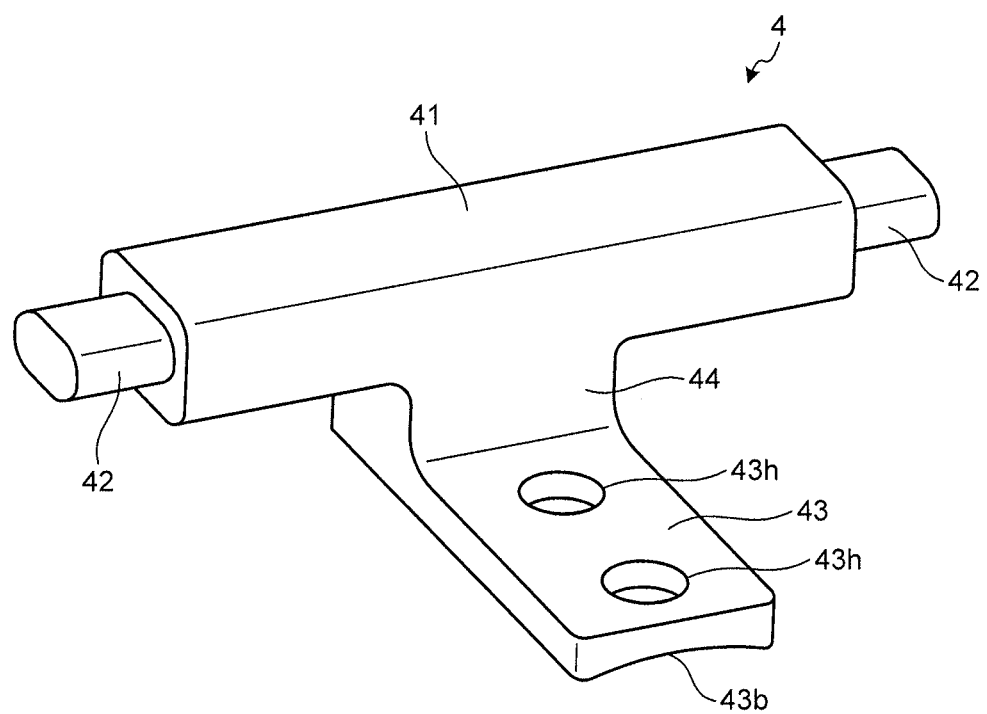
FIG. 29 is a perspective view illustrating an inner column bracket according to the fifth embodiment.

As illustrated in FIGS. 27 and 28, the steering device 100 includes an inner column bracket 4. FIG. 29 is a perspective view illustrating the inner column bracket according to the fifth embodiment. As illustrated in FIG. 29, the inner column bracket 4 includes, for example, an arm portion 41, an insertion portion 42, a neck portion 44, and a leg portion 43. For example, as illustrated in FIG. 28, the arm portion 41 is a rod-shaped portion which connects two first telescopic friction plates 21 facing each other at both sides of the outer column 54. The insertion portion 42 is a portion which is formed at both ends of the arm portion 41 and is inserted into a hole formed in the first telescopic friction plate 21. The insertion portion 42 is thinner than the arm portion 41. The neck portion 44 is a portion which is projected from a part of the arm portion 41 in a direction perpendicular to the length direction of the arm portion 41. The leg portion 43 is a plate-shaped portion which is provided in the end opposite to the arm portion 41 of the neck portion 44 and contacts the inner column 51. As illustrated in FIG. 29, an inner column side surface 43b of the leg portion 43 is formed in a shape that follows the shape of the outer periphery surface of the inner column 51.

As illustrated in FIG. 28, the inner column bracket 4 is connected to the first telescopic friction plates 21 disposed at both sides of the outer column 54. The inner column bracket 4 is supported by the first telescopic friction plate 21 in a manner such that the insertion portion 42 is inserted into a hole formed in the first telescopic friction plate 21. Further, the first telescopic friction plates 21 which are disposed at both sides of the outer column 54 face each other with the arm portion 41 of the inner column bracket 4 interposed therebetween. Further, the inner column bracket 4 is connected to the inner column 51 by the leg portion 43.

In order to detachably connect the inner column bracket 4 and the inner column 51 to each other, as illustrated in FIG. 27, a first hole 51h is opened in the inner column 51 and a second hole 43h is opened in the leg portion 43. The first hole 51h and the second hole 43h communicate with each other. For example, in the fifth embodiment, each of the first hole 51h and the second hole 43h is provided at two positions. When the connection member M is inserted into a position straddling the first hole 51h and the second hole 43h, the leg portion 43 of the inner column bracket 4 and the inner column 51 are detachably connected to each other. Further, the first hole 51h and the second hole 43h are disposed at a position where the distance values from the first telescopic friction plates 21 disposed at both sides of the outer column 54 are equal to each other.

Further, the inner column bracket 4 is disposed so that at least a part is fitted into the slit 54s of the outer column 54. Specifically, the leg portion 43 of the inner column bracket 4 is fitted so as to face the inner wall of the slit 54s.

In the fifth embodiment, the connection member M is a resinous member and is formed of, for example, polyacetal. When the connection member M as the resinous member is solidified while being injected into a position straddling the first hole 51h and the second hole 43h, the leg portion 43 of the inner column bracket 4 and the inner column 51 are connected to each other.

Figure 30:
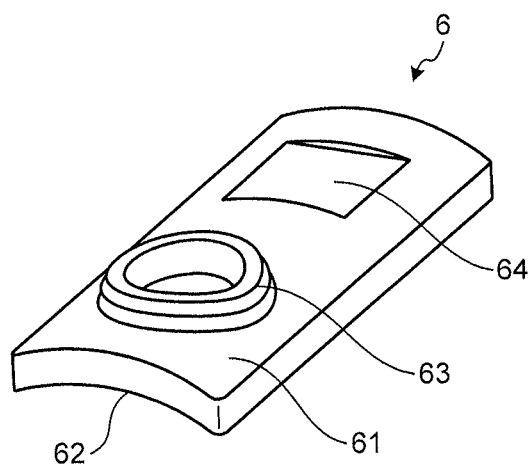
FIG. 30 is a perspective view illustrating an inner plate according to the fifth embodiment when viewed from a shielding surface.
Figure 31:
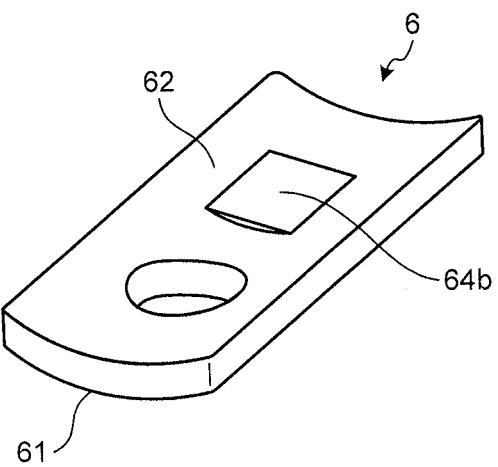
FIG. 31 is a perspective view illustrating the inner plate according to the fifth embodiment when viewed from a rear surface.

FIG. 30 is a perspective view illustrating an inner plate according to the fifth embodiment when viewed from a shielding surface. FIG. 31 is a perspective view illustrating the inner plate according to the fifth embodiment when viewed from a rear surface. The steering device 100 includes an inner plate 6 which is provided in the inner periphery surface of the inner column 51 so that the connection member M injected into the first hole 51h and the second hole 43h does not flow to the inside of the inner column 51. The inner plate 6 is, for example, a plate-shaped member having a shape following the shape of the inner periphery surface of the inner column 51. The inner plate 6 is provided in the inner periphery surface of the inner column 51 and covers the inside of the first hole 51h. The inner plate 6 includes a protrusion portion 63 and a concave portion 64 in a shielding surface 61 facing the inner periphery surface of the inner column 51.

The protrusion portion 63 bulges in, for example, an annular shape in a direction perpendicular to the shielding surface 61. For example, the inside of the portion which bulges in an annular shape is a hole penetrating to a rear surface 62. As illustrated in FIG. 27, the protrusion portion 63 is fitted to a fitting hole 51ha provided in the inner column 51. For example, the inner plate 6 is fixed to the inner column 51 in a manner such that the protrusion portion 63 is swaged to the fitting hole 51ha. In addition, the inner plate 6 may be fixed to the inner column 51 in a manner such that the protrusion portion 63 is press-inserted into the fitting hole 51ha.

The concave portion 64 is formed by, for example, a press work. For this reason, as illustrated in FIG. 31, a protrusion portion 64b is provided at the rear side of the concave portion 64. The concave portion 64 is disposed at a position facing the first hole 51h as illustrated in FIG. 27. In the fifth embodiment, the concave portion 64 is provided at one position so as to face two first holes 51h. Accordingly, the concave portion 64 causes two first holes 51h to communicate with each other.

When the inner column bracket 4 and the inner column 51 are connected to each other, the connection member M is injected from the second hole 43h while the concave portion 64 faces two first holes 51h. The connection member M that is injected from the second hole 43h is solidified while being injected into the second hole 43h, the first hole 51h, and the concave portion 64. Accordingly, since the separation of the connection member M solidified in the concave portion 64 is prevented, it is possible to prevent a problem in which the connection member M comes off from the first hole 51h and the second hole 43h.

Further, for example, the connection member M is injected so as to come out of the concave portion 64. Since the connection member M comes out of the concave portion 64, a gap between the shielding surface 61 of the inner plate 6 and the inner column 51 is filled by the connection member M. Accordingly, a play of the inner plate 6 is suppressed.

Further, a state where the connection member M comes out of the concave portion 64 is visually checked from the end surface of the inner column 51. For this reason, it is possible to more reliably check a state where the connection member M is injected by a predetermined amount or more. In addition, in order to easily visually check a state where the connection member M comes out of the concave portion 64, the inner column 51 may be formed so that a visual checking slit is provided at a portion facing the rear surface 62 of the inner plate 6 or the vicinity thereof.

When an excessive load is applied to the steering wheel 81, the load is transmitted to the inner column 51 through the input shaft 82a, and hence the inner column 51 is moved forward. Meanwhile, the inner column bracket 4 which is supported by the first telescopic friction plate 21 does not move. For this reason, since a shearing force is applied to the connection member M, the connection member M is cut when the load exceeds the allowable shearing force of the connection member M. When the connection member M is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. Thus, when an excessive load is applied to the steering wheel due to the collision of the operator with respect to the steering wheel 81, a force for moving the inner column 51 decreases immediately after the excessive load is applied to the steering wheel, and hence impact is absorbed.

Further, even when the connection member M is cut, the outer column 54 is supported by the outer column bracket 52 fixed to the vehicle body side member 13. Further, the inner column 51 is supported by the outer column 54. For this reason, even when the connection member M is cut, the steering column 50 does not drop.

Further, it is desirable that the inner column 51 move straight in the axial direction after the connection member M is cut. When the movement direction of the inner column 51 forms an angle with respect to the axial direction of the outer column 54, the movement of the inner column 51 is easily disturbed or a friction force generated between the inner column 51 and the outer column 54 easily becomes larger than a predetermined value.

In the fifth embodiment, as illustrated in FIG. 28, the inner column bracket 4 is bonded to the first telescopic friction plates 21 disposed at both sides of the outer column 54. Accordingly, when an axial load is applied to the inner column bracket 4, a tightening force is applied to the inner column bracket 4 from both sides of the outer column 54. For this reason, it is possible to stabilize the posture of the inner column bracket 4 when the connection member M is cut. Thus, when the inner column starts to move, the posture of the inner column 51 is maintained to be straight in the axial direction. Accordingly, the inner column 51 is likely to move straight in the axial direction.

The first telescopic friction plates 21 are disposed facing each other at both sides of the inner column bracket 4 which is interposed between the first telescopic friction plates, and the first hole 51h and the second hole 43h are disposed at a position where the distance values from both of the first telescopic friction plates 21 are equal. Accordingly, when an axial load is applied to the inner column bracket 4, a more stable tightening force is applied from both sides of the outer column 54 to the inner column bracket 4. Accordingly, it is possible to stabilize the posture of the inner column bracket 4 when the connection member M is cut. Thus, when the inner column 51 starts to move, it is possible to maintain the posture to be straighter in the axial direction. Thus, the inner column 51 is likely to move more straight in the axial direction.

Further, even when the inner column bracket 4 may not receive a stable tightening force from both sides of the outer column 54, since the leg portion 43 of the inner column bracket 4 is fitted into the slit so as to face the inner wall of the slit 54s, the inner column bracket 4 is guided by the slit 54s. Accordingly, it is possible to stabilize the posture of the inner column bracket 4 when the connection member M is cut.

In addition, the allowable shearing force of the connection member M is adjusted by changing the number of the first holes 51h and the second holes 43h, the cross-sectional areas of the first hole 51h and the second hole 43h, and the material of the connection member M. For example, each of the first hole 51h and the second hole 43h may be provided at one position or three or more positions. Further, the connection member M may be formed of, for example, metal including non-ferrous metal, an adhesive, or rubber.

Figure 32:
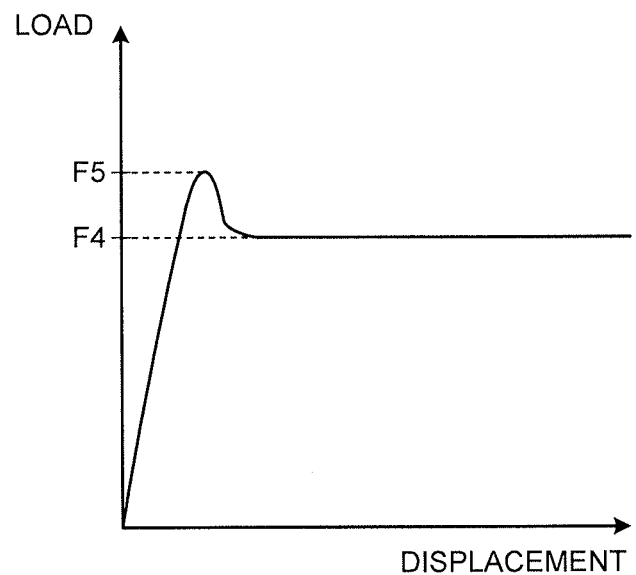
FIG. 32 is a diagram illustrating a relation between a displacement amount of a steering column and a load necessary to move the steering column of a comparative example.
Figure 33:
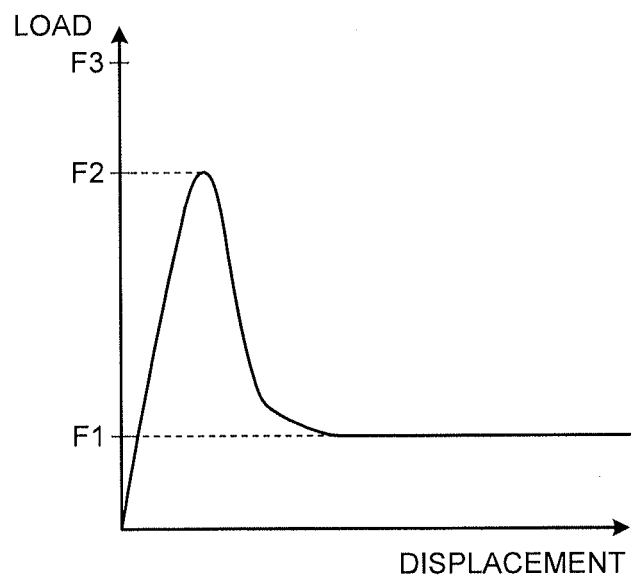
FIG. 33 is a diagram illustrating a relation between a displacement amount of a steering column and a load necessary to move the steering column of the fifth embodiment.

FIG. 32 is a diagram illustrating a relation between a displacement amount of a steering column and a load necessary to move the steering column of a comparative example. FIG. 33 is a diagram illustrating a relation between a displacement amount of the steering column and a load necessary to move the steering column of the fifth embodiment. In FIGS. 32 and 33, the horizontal axis indicates the forward displacement amount of the steering column, and the vertical axis indicates the load necessary to move the steering column forward.

The comparative example is an example in the case where the outer column is attached to the vehicle body through the capsule as in the technique disclosed in Patent Literature 1. In the comparative example, the outer column is disposed at the rear side in relation to the inner column. Then, when an excessive load is applied to the outer column, the rod contacts the end of the telescopic adjustment hole integrated with the outer column, and then the load is transmitted to the capsule through the bracket. A force F5 illustrated in FIG. 32 indicates the allowable shearing force of the capsule.

In the comparative example, the outer column is supported in the axial direction by a friction force generated between the inner column and the outer column due to the tightening of the bracket. A force F4 illustrated in FIG. 32 indicates the friction force that supports the outer column. The force F4 is smaller than the force F5. In order to prevent the movement of the outer column by the load applied in normal use, the force F4 needs to be maintained at a predetermined value or more.

In the comparative example, when a load of the force F5 or more is applied to the outer column, the capsule is cut and the outer column is separated from the vehicle body. Subsequently, the outer column moves in the axial direction while absorbing a friction force with respect to the inner column. However, since the force F4 is maintained at a predetermined value or more as described above, the outer column moves smoothly, and hence the operator may not be easily protected from the secondary collision.

Meanwhile, in the fifth embodiment, the inner column 51 is supported in the axial direction by a first friction force generated between the inner column and the outer column 54 by the tightening of the outer column bracket 52 and a second friction force generated between the first telescopic friction plate 21 and the member (the outer column bracket 52, the second telescopic friction plate 22, and the outer column 54) contacting the first telescopic friction plate 21. The force F1 illustrated in FIG. 33 indicates the first friction force, and the force F3 indicates the sum of the first friction force and the second friction force. Further, the force F2 illustrated in FIG. 33 indicates the allowable shearing force of the connection member M. The force F2 is smaller than the force F3 and is larger than the force F1.

In the fifth embodiment, when a load of the force F2 or more is applied to the inner column 51, the connection member M is cut and the inner column 51 is separated from the inner column bracket 4. Accordingly, since the connection between the inner column 51 and the first telescopic friction plate 21 is released, the second friction force is not applied to the inner column 51. For this reason, the inner column 51 moves in the axial direction while absorbing an impact by the first friction force after the connection member M is cut. In the steering device 100 according to the fifth embodiment, when the first friction force is set to be small, the inner column 51 moves smoothly, and hence the operator may be easily protected from a secondary collision.

In the fifth embodiment, even when the setting value of the first friction force is small, the second friction force may compensate a degree in which the first friction force decreases among the force supporting the inner column 51 in the axial direction. For this reason, since the steering device 100 according to the fifth embodiment adjusts the setting value of the first friction force and the setting value of the second friction force, it is possible to suppress the inner column 51 from moving by the load applied in normal use and to more easily protect the operator from the secondary collision.

As described above, the steering device 100 according to the fifth embodiment includes the cylindrical inner column 51 which rotatably supports the input shaft 82*a* connected to the steering wheel 81 and has the first hole 51*h* opened therein and the outer column 54 which is formed in a cylindrical shape for inserting at least a part of the inner column 51 thereinto and has the slit 54*s* formed by notching one insertion end of the inner column 51. Further, the steering device 100 includes the outer column bracket 52 which is fixed to the vehicle body side member 13 so as to support the outer column 54 and tightens the outer column 54 along with the telescopic friction plate (the first telescopic friction plate 21) as the plate material. Further, the steering device 100 includes the inner column bracket 4 which is supported by the telescopic friction plate (the first telescopic friction plate 21) and in which the second hole 43*h* is opened. Further, the steering device 100 includes the connection member M which detachably connects the inner column 51 and the inner column bracket 4 to each other at a position straddling the first hole 51*h* and the second hole 43*h*. The telescopic friction plate (the first telescopic friction plate 21) is disposed at both sides of the outer column 54. The inner column bracket 4 includes the arm portion 41 which connects the telescopic friction plates (the first telescopic friction plates 21) disposed at both sides of the outer column 54, the neck portion 44 which is projected from the arm portion 41 in a direction perpendicular to the length direction of the arm portion 41, and the leg portion 43 which is provided at the end opposite to the arm portion 41 of the neck portion 44 and contacts the inner column 51.

Accordingly, in the steering device 100 according to the fifth embodiment, when an excessive load is applied to the steering wheel 81, the load is transmitted to the inner column 51 through the input shaft 82*a* so as to move the inner column 51 forward. Meanwhile, the inner column bracket 4 which is supported by the first telescopic friction plate 21 does not move. For this reason, since a shearing force is applied to the connection member M, the connection member M is cut when the load exceeds the allowable shearing force of the connection member M. When the connection member M is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. For this reason, the inner column 51 of the steering column 50 may move toward the front side of the vehicle body. Further, even when the connection member M is cut, the outer column 54 is supported by the outer column bracket 52 fixed to the vehicle body side member 13. Further, the inner column 51 is supported by the outer column 54. For this reason, even when the connection member M is cut, the steering column 50 does not drop. Thus, the steering device 100 according to the fifth embodiment may prevent a problem in which the steering column 50 is dropped by the erroneous operation even when the setting value (the allowable shearing force of the connection member M) of the separation load in which the steering column 50 moves toward the front side of the vehicle body is decreased.

Further, when an axial load is applied to the inner column bracket 4, a tightening force is applied from both sides of the outer column 54 to the inner column bracket 4. For this reason, it is possible to stabilize the posture of the inner column bracket 4 when the connection member M is cut. Thus, when the inner column 51 starts to move, the posture of the inner column is maintained to be straight in the axial direction. Accordingly, since the inner column 51 is likely to move straight in the axial direction, it is possible to prevent a problem in which the movement of the inner column 51 is disturbed or a problem in which a friction force generated between the inner column 51 and the outer column 54 becomes larger than a predetermined value.

Further, in the steering device 100 according to the fifth embodiment, the telescopic friction plates (the first telescopic friction plates 21), which are disposed at both sides of the outer column 54, face each other with the inner column bracket 4 interposed between the telescopic friction plates, and the first hole 51*h* and the second hole 43*h* are disposed at a position where the distance values from respective one of the telescopic friction plates (the first telescopic friction plates 21), facing each other with the inner column bracket 4 interposed between the telescopic friction plates, are equal. Accordingly, when an axial load is applied to the inner column bracket 4, a more stable tightening force is applied from both sides of the outer column 54 to the inner column bracket 4, which stabilizes the posture of the inner column bracket 4 when the connection member M is cut. Thus, when the inner column starts to move, the posture of the inner column 51 is likely to be maintained to be straight in the axial direction. Accordingly, since the inner column 51 is likely to move straight in the axial direction, it is possible to prevent a problem in which the movement of the inner column 51 is disturbed or a problem in which a friction force generated between the inner column 51 and the outer column 54 becomes larger than a predetermined value.

Further, in the steering device 100 according to the fifth embodiment, the outer column 54 is located at the front side of the vehicle body, includes the pivot bracket 55, and is formed such that the detached inner column 51 can be inserted into the outer column 54. Accordingly, the axial direction of the outer column 54 is aligned to the axial direction of the inner column 51. For this reason, the outer column 54 is likely to guide the inner column 51 when the inner column 51 moves in the axial direction. Accordingly, since the inner column 51 is likely to move straight in the axial direction, it is possible to prevent a problem in which the movement of the inner column 51 is disturbed or a problem in which a friction force generated between the inner column 51 and the outer column 54 becomes larger than a predetermined value.

Modified Example of Fifth Embodiment

Figure 34:
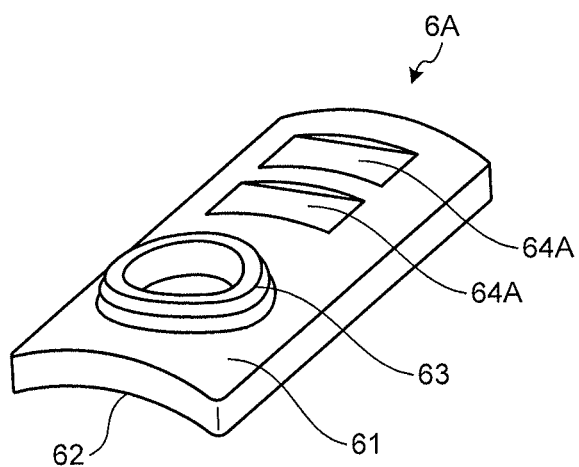
FIG. 34 is a perspective view illustrating an inner plate according to a modified example of the fifth embodiment when viewed from a shielding surface.
Figure 35:
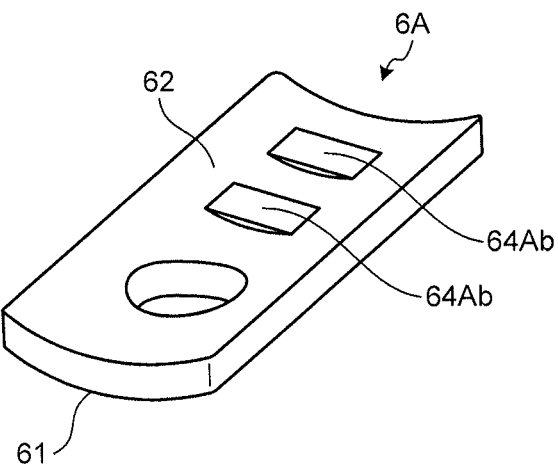
FIG. 35 is a perspective view illustrating the inner plate according to the modified example of the fifth embodiment when viewed from a rear surface.

FIG. 34 is a perspective view illustrating an inner plate according to a modified example of the fifth embodiment when viewed from a shielding surface. FIG. 35 is a perspective view illustrating the inner plate according to the modified example of the fifth embodiment when viewed from a rear surface. The modified example of the fifth embodiment is different from the fifth embodiment in that the inner plate has a different configuration. In addition, the same reference signs will be given to the same components as those of the above-described embodiments, and the repetitive description thereof will not be presented.

The steering device 100 according to the modified example of the fifth embodiment includes an inner plate 6A in the inner periphery surface of the inner column 51 so that the connection member M injected in the first hole 51h and the second hole 43h does not flow out to the inside of the inner column 51. The inner plate 6A is, for example, a plate-shaped member that has a shape following the shape of the inner periphery surface of the inner column 51. The inner plate 6A includes the protrusion portion 63 and two concave portions 64A in the shielding surface 61 facing the inner periphery surface of the inner column 51.

The concave portion 64A is formed by, for example, a press work. For this reason, as illustrated in FIG. 35, a protrusion portion 64Ab is provided at the rear side of the concave portion 64A. Two concave portions 64A are respectively disposed maintaining a predetermined distance therebetween. One concave portion 64A faces one first hole 51h. In addition, a number of concave portion 64A may not be two, and may be the same as a number of the first hole 51h.

When connecting the inner column bracket 4 with the inner column 51, the concave portion 64A is arranged to face the first hole 51h, and the connection member M is injected from the second hole 43h. The connection member M, which is injected through the second hole 43h, is also injected into the second hole 43h, the first hole 51h, and the concave portion 64A, and then solidified. Accordingly, the connection member M solidified in the concave portion 64A functions as a stopper preventing the connection member M solidified from detaching the first hole 51h and the second hole 43h, it is possible to prevent a problem in which the connection member M comes off from the first hole 51h and the second hole 43h.

Further, in the modified example of the fifth embodiment, since two concave portions 64A do not communicate with each other, a communication space using the second hole 43h, the first hole 51h, and the concave portion 64A becomes smaller than that of the fifth embodiment. For this reason, since the injected connection member M is easily solidified, the inner column bracket 4 and the inner column 51 are more reliably connected to each other.

Further, in the fifth embodiment, the connection members M that are injected from two different second holes 43h meet together at the concave portion 64. For this reason, there is a possibility that the connection members M meeting together at the concave portion 64 are integrated and prevented from being solidified. On the contrary, when the inner plate 6A according to the modified example of the fifth embodiment is used, since the connection members M that are injected from two different second holes 43h respectively flow into different concave portions 64A, the connection members M are more reliably solidified in the concave portion 64A.

Sixth Embodiment

Figure 36:
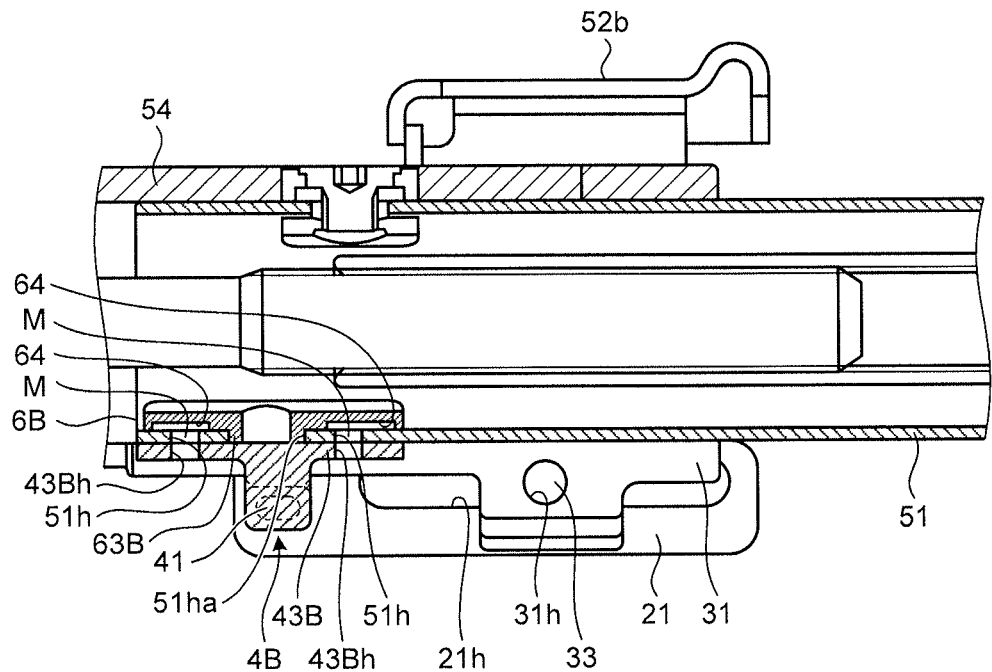
FIG. 36 is a cross-sectional view illustrating a steering device according to a sixth embodiment when taken along the line corresponding to the line e-e of FIG. 26.
Figure 37:
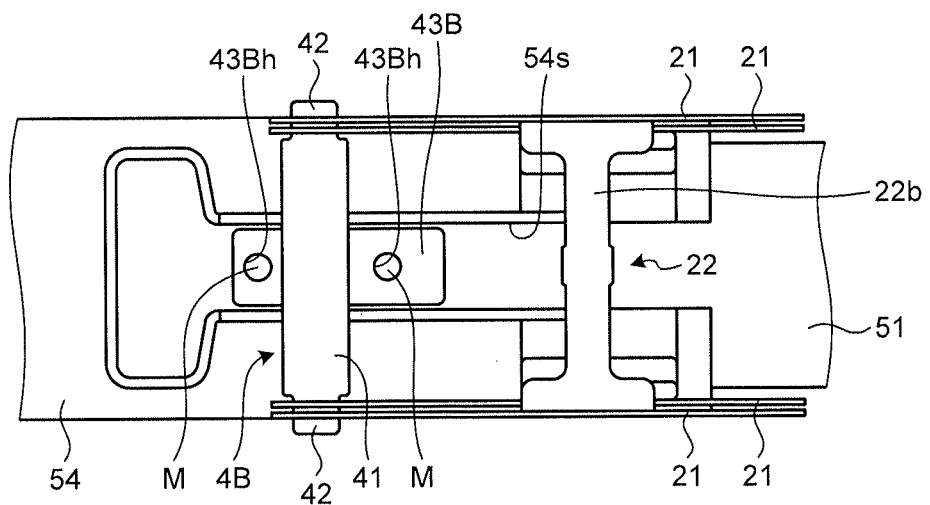
FIG. 37 is a diagram illustrating a bottom surface of the steering device according to the sixth embodiment.

FIG. 36 is a cross-sectional view illustrating a steering device according to a sixth embodiment when taken along the line corresponding to the line e-e of FIG. 26. FIG. 37 is a diagram illustrating a bottom surface of the steering device according to the sixth embodiment. In addition, the same reference signs will be given to the same components as those of the above-described embodiments, and the repetitive description thereof will not be presented.

Figure 38:
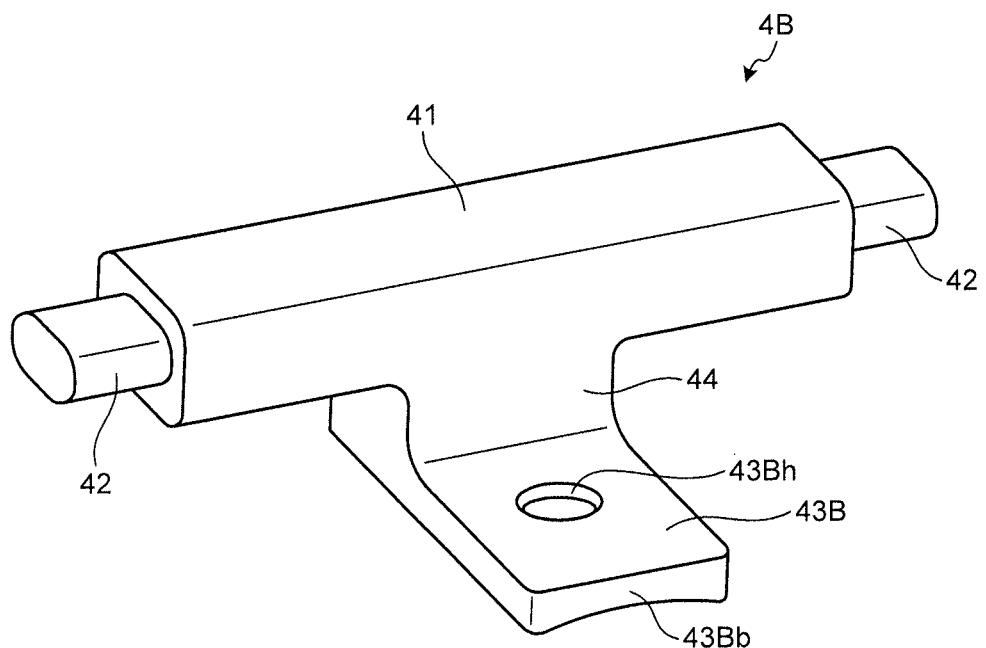
FIG. 38 is a perspective view illustrating an inner column bracket according to the sixth embodiment.

As illustrated in FIGS. 36 and 37, the steering device 100 includes an inner column bracket 4B. FIG. 38 is a perspective view illustrating an inner column bracket according to the sixth embodiment. As illustrated in FIG. 38, the inner column bracket 4B includes, for example, the arm portion 41, the insertion portion 42, the neck portion 44, and a leg portion 43B. For example, the arm portion 41 is, as illustrated in FIG. 37, a rod-shaped portion which connects two pairs of first telescopic friction plates 21 facing each other at both sides of the outer column 54. The insertion portion 42 is a portion which is formed at both ends of the arm portion 41 and is inserted into a hole formed in the first telescopic friction plate 21. The insertion portion 42 is thinner than the arm portion 41. The neck portion 44 is a portion which is projected from a part of the arm portion 41 in a direction perpendicular to the length direction of the arm portion 41. The leg portion 43B is a plate-shaped portion which is provided at the end opposite to the arm portion 41 of the neck portion 44 and contacts the inner column 51. As illustrated in FIG. 38, an inner column side surface 43Bb of the leg portion 43B is formed in a shape that follows the shape of the outer periphery surface of the inner column 51.

As illustrated in FIG. 37, the inner column bracket 4B is connected to the first telescopic friction plates 21 which are disposed at both sides of the outer column 54. The inner column bracket 4B is supported by the first telescopic friction plate 21 in a manner such that the insertion portion 42 is inserted into a hole formed in the first telescopic friction plate 21. Further, the first telescopic friction plates 21, which are disposed at both sides of the outer column 54, face each other with the arm portion 41 of the inner column bracket 4B interposed between the first telescopic friction plates 21. Further, the inner column bracket 4B is connected to the inner column 51 by the leg portion 43B.

In order to detachably connect the inner column bracket 4B and the inner column 51 to each other, as illustrated in FIG. 36, the first hole 51h is opened in the inner column 51 and a second hole 43Bh is opened in the leg portion 43B. The leg portion 43B is disposed at the front and rear sides of the neck portion 44 in the axial direction of the inner column, and the first hole 51h and the second hole 43Bh communicate with each other. For example, in the sixth embodiment, each of the first hole 51h and the second hole 43Bh is provided at one position of each leg portion 43B, and hence is provided at two positions in total. When the connection member M is inserted into a position straddling the first hole 51h and the second hole 43Bh, the leg portion 43B of the inner column bracket 4B and the inner column 51 are detachably connected to each other. Further, the first hole 51h and the second hole 43Bh are disposed at a position where the distance values from the first telescopic friction plates 21 disposed at both sides of the outer column 54 are equal.

Further, the inner column bracket 4B is disposed so that at least a part is fitted into the slit 54s of the outer column 54. Specifically, the leg portion 43B of the inner column bracket 4B is fitted into the slit 54s facing the inner wall thereof.

In the sixth embodiment, the connection member M is a resinous member, and is formed of, for example, polyacetal. When the connection member M as the resinous member is injected to a position straddling the first hole 51h and the second hole 43Bh and solidified, the leg portion 43B of the inner column bracket 4B and the inner column 51 are connected to each other.

Figure 39:
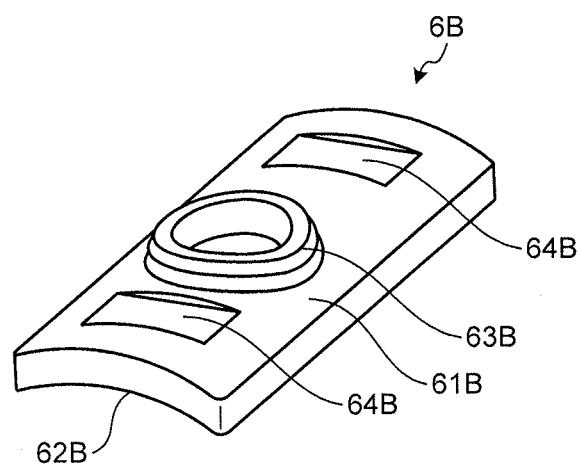
FIG. 39 is a perspective view illustrating an inner plate according to the sixth embodiment when viewed from a shielding surface.
Figure 40:
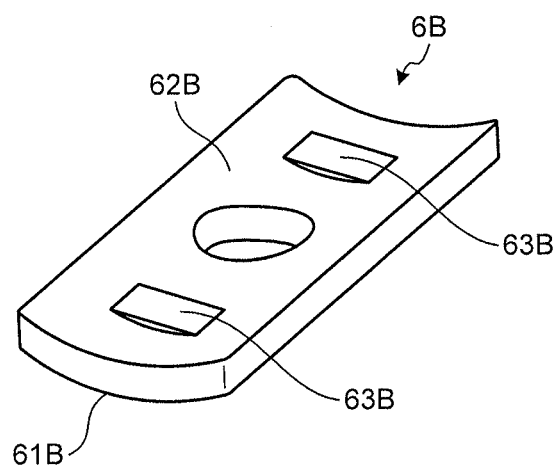
FIG. 40 is a perspective view illustrating the inner plate according to the sixth embodiment when viewed from a rear surface.

FIG. 39 is a perspective view illustrating an inner plate according to the sixth embodiment when viewed from a shielding surface. FIG. 40 is a perspective view illustrating the inner plate according to the sixth embodiment when viewed from a rear surface. The steering device 100 includes an inner plate 6B in the inner periphery surface of the inner column 51 so that the connection member M injected to the first hole 51h and the second hole 43Bh does not flow out to the inside of the inner column 51. The inner plate 6B is, for example, a plate-shaped member having a shape following the shape of the inner periphery surface of the inner column 51. The inner plate 6B is provided in the inner periphery surface of the inner column 51 and covers the inside of the first hole 51h. The inner plate 6B includes a protrusion portion 63B and a concave portion 64B in a shielding surface 61B facing the inner periphery surface of the inner column 51.

The protrusion portion 63B bulges in, for example, an annular shape in a direction perpendicular to the shielding surface 61B. For example, the inside of the portion which bulges in an annular shape is a hole penetrating to a rear surface 62B. As illustrated in FIG. 36, the protrusion portion 63B is fitted to a fitting hole 51ha provided in the inner column 51. For example, the inner plate 6B is fixed to the inner column 51 in a manner such that the protrusion portion 63B is swaged to the fitting hole 51ha. In addition, the inner plate 6B may be fixed to the inner column 51 in a manner such that the protrusion portion 63B is press-inserted into the fitting hole 51ha.

The concave portion 64B is formed by, for example, a press work. For this reason, as illustrated in FIG. 40, a protrusion portion 63B is provided at the rear side of the concave portion 64B. The concave portion 64B is disposed at a position facing the first hole 51h as illustrated in FIG. 36. In the sixth embodiment, the concave portion 64B is provided at one position so as to face two first holes 51h. Accordingly, the concave portion 64B causes two first holes 51h to communicate with each other.

When connecting the inner column bracket 4B with the inner column 51, the concave portion 64B is arranged to face two first holes 51h, and the connection member M is injected from the second hole 43Bh. The connection member M, which is injected through the second hole 43Bh, is also injected into the second hole 43Bh, the first hole 51h, and the concave portion 64A, and then solidified. Accordingly, the connection member M solidified in the concave portion 64B functions as a stopper preventing the connection member M solidified from detaching the first hole 51h and the second hole 43Bh, it is possible to prevent a problem in which the connection member M comes off from the first hole 51h and the second hole 43Bh.

Further, for example, the connection member M is injected so as to come out of the concave portion 64B. Since the connection member M comes out of the concave portion 64B, a gap between the shielding surface 61B of the inner plate 6B and the inner column 51 is filled by the connection member M. Accordingly, the play of the inner plate 6B is suppressed.

Further, a state where the connection member M comes out of the concave portion 64B is visually checked from the end surface of the inner column 51. For this reason, it is possible to more reliably check a state where the connection member M is injected by a predetermined amount or more. In addition, in order to easily visually check a state where the connection member M comes out of the concave portion 64B, the inner column 51 may be formed so that a visual checking slit is provided at a portion facing the rear surface 62B of the inner plate 6B or the vicinity thereof.

In the sixth embodiment, the inner column bracket 4B is bonded to the first telescopic friction plates 21 disposed at both sides of the outer column 54 as illustrated in FIG. 37. Accordingly, when an axial load is applied to the inner column bracket 4B, a tightening force is applied from both sides of the outer column 54 to the inner column bracket 4B. For this reason, it is possible to stabilize the posture of the inner column bracket 4B when the connection member M is cut. Thus, which the inner column 51 starts to move, the posture of the inner column 51 is likely to be maintained to be straight in the axial direction. Thus, the inner column 51 is likely to move straight in the axial direction.

Further, the first hole 51h and the second hole 43Bh are closely disposed at the front and rear sides of the neck portion 44 of the inner column bracket 4B, in the axial direction of the inner column 51. Accordingly, even when an axial load is applied to the inner column bracket 4B, since the distance between the cut portion of the connection member M and the insertion portion 42 fixed by the first telescopic friction plate 21 is extremely short, the moment force applied to the inner column bracket 4B is small, and hence the connection member M is cut while the posture of the inner column bracket 4B is stabilized.

Further, the first hole 51h and the second hole 43Bh are disposed at a position where the distance values from the first telescopic friction plates 21 disposed at both sides with the inner column bracket 4B interposed therebetween are equal to each other. Accordingly, when an axial load is applied to the inner column bracket 4B, a stable tightening force is applied from both sides of the outer column 54 to the inner column bracket 4B. Therefore, it is possible to stabilize the posture of the inner column bracket 4B when the connection member M is cut. Thus, when the inner column 51 starts to move, the posture of the inner column 51 is maintained to be straight in the axial direction. Thus, the inner column 51 is likely to move straight in the axial direction.

Further, even when a stable tightening force is not applied from both sides of the outer column 54 to the inner column bracket 4B, since the leg portion 43B of the inner column bracket 4B is fitted into the slit 54s facing the inner wall thereof, the inner column bracket 4B is guided by the slit 54s. Thus, it is possible to stabilize the posture of the inner column bracket 4B when the connection member M is cut.

A diagram illustrating a relation between a displacement amount of a steering column and a load necessary to move the steering column of the sixth embodiment is the same as FIG. 33.

In the sixth embodiment, the inner column 51 is supported in the axial direction by a first friction force generated between the inner column and the outer column 54 by the tightening of the outer column bracket 52 and a second friction force generated between the first telescopic friction plate 21 and the member (the outer column bracket 52, the second telescopic friction plate 22, and the outer column 54) contacting the first telescopic friction plate 21. The force F1 illustrated in FIG. 33 indicates the first friction force, and the force F3 indicates the sum of the first friction force and the second friction force. Further, the force F2 illustrated in FIG. 33 indicates the allowable shearing force of the connection member M. The force F2 is smaller than the force F3 and is larger than the force F1.

In the sixth embodiment, when a load of the force F2 or more is applied to the inner column 51, the connection member M is cut and the inner column 51 is separated from the inner column bracket 4B. Accordingly, since the connection between the inner column 51 and the first telescopic friction plate 21 is released, the second friction force is not applied to the inner column 51. For this reason, the inner column 51 moves in the axial direction while absorbing an impact by the first friction force after the connection member M is cut. In the steering device 100 according to the sixth embodiment, when the first friction force is set to be small, the inner column 51 moves smoothly, and hence the operator may be easily protected from the secondary collision.

In the sixth embodiment, even when the setting value of the first friction force is small, the second friction force may compensate a degree in which the first friction force decreases among the force supporting the inner column 51 in the axial direction. For this reason, since the steering device 100 according to the sixth embodiment adjusts the setting value of the first friction force and the setting value of the second friction force, it is possible to suppress the inner column 51 from moving by the load applied in normal use and to more easily protect the operator from the secondary collision.

Seventh Embodiment

Figure 41:
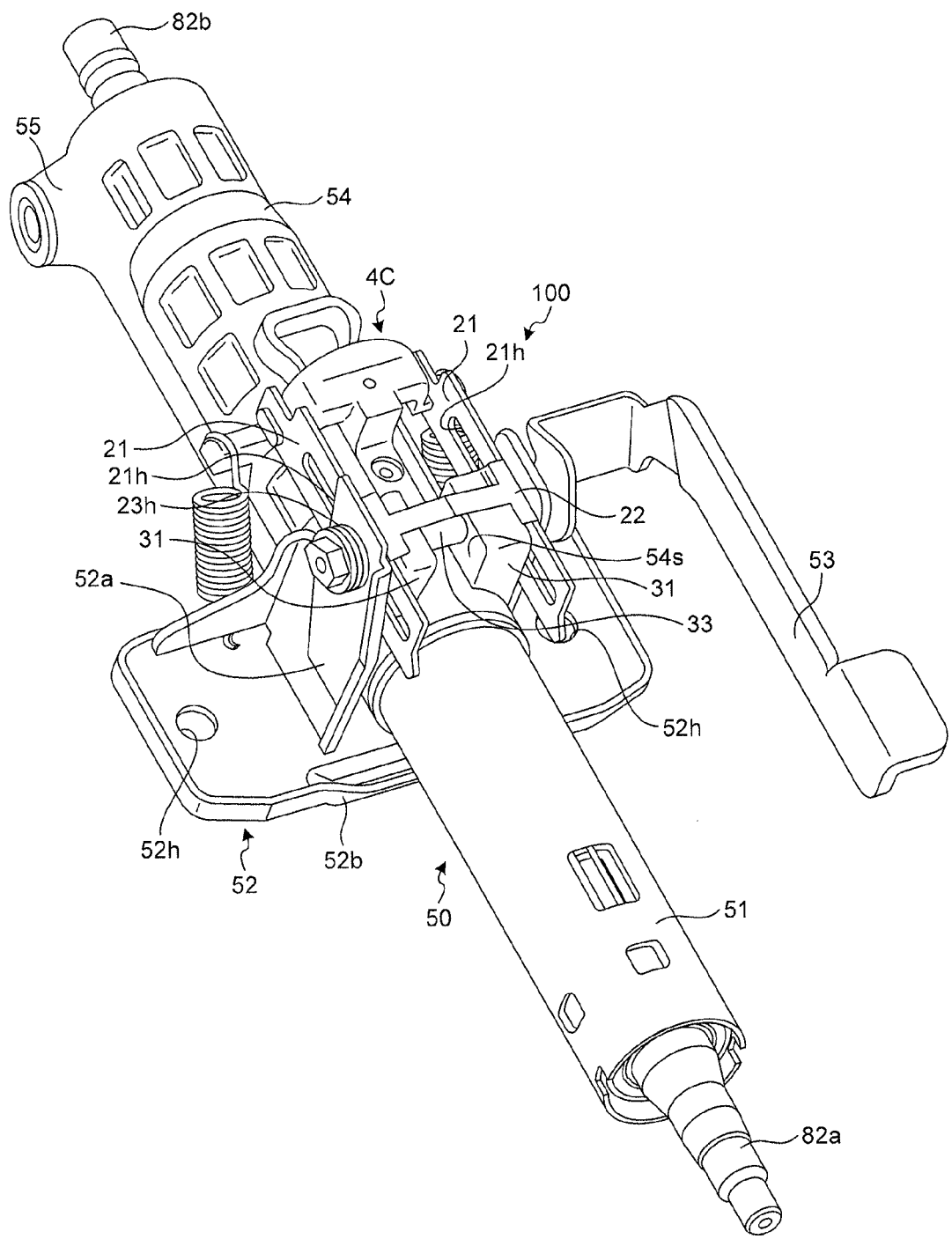
FIG. 41 is a perspective view illustrating a steering device according to a seventh embodiment when viewed from a bottom surface.
Figure 42:
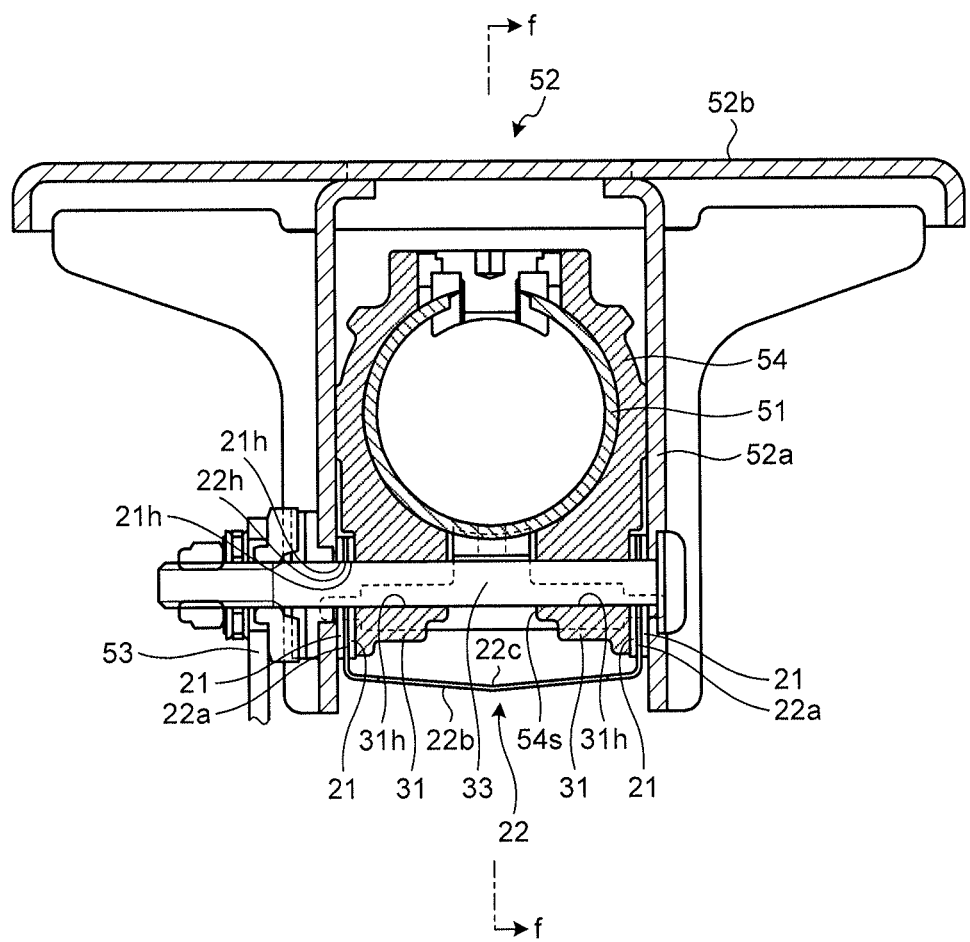
FIG. 42 is a cross-sectional view illustrating the steering device according to the seventh embodiment when taken along the line corresponding to the line d-d of FIG. 24.
Figure 43:
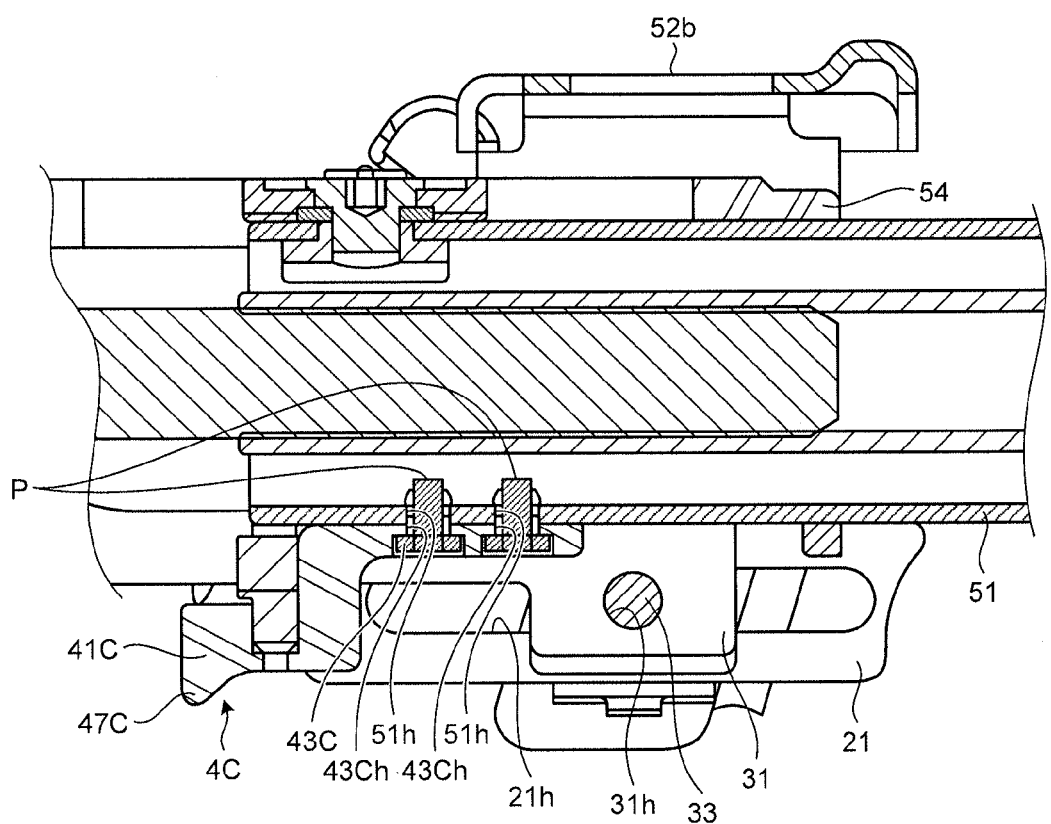
FIG. 43 is a cross-sectional view illustrating the steering device according to the seventh embodiment when taken along the line corresponding to the line f-f of FIG. 42.
Figure 44:
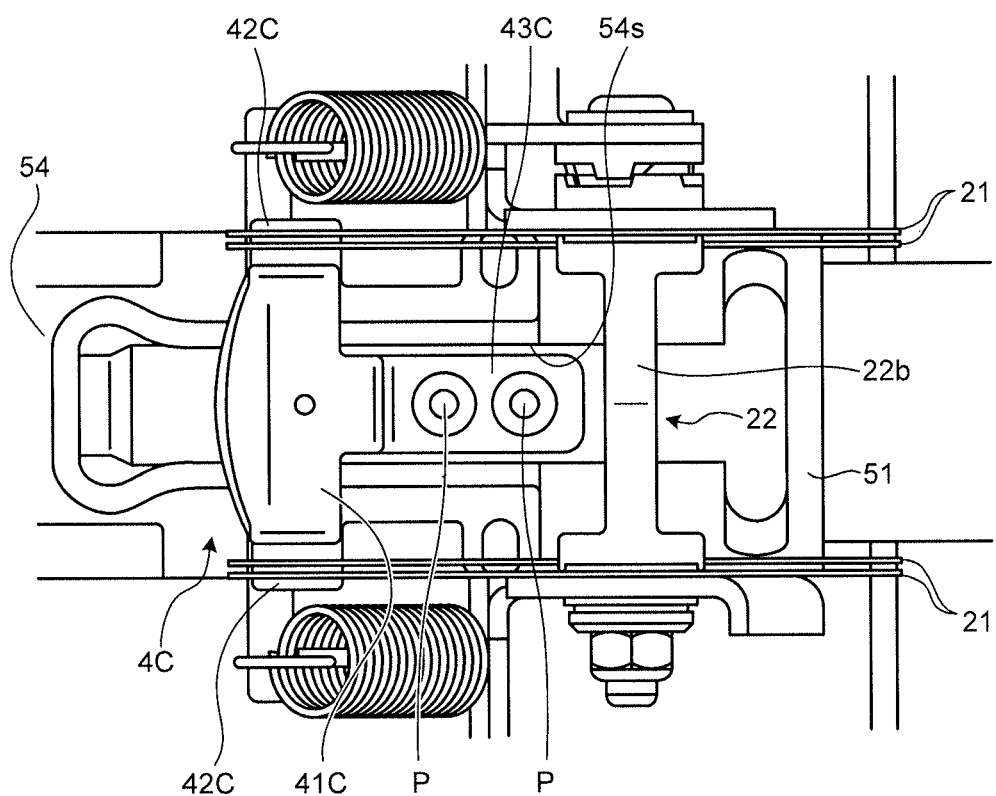
FIG. 44 is a diagram illustrating a bottom surface of the steering device according to the seventh embodiment.

FIG. 41 is a perspective view illustrating a steering device according to a seventh embodiment when viewed from a bottom surface. FIG. 42 is a cross-sectional view illustrating the steering device according to the seventh embodiment when taken along the line corresponding to the line d-d of FIG. 24. FIG. 43 is a cross-sectional view illustrating the steering device according to the seventh embodiment when taken along the line corresponding to the line f-f of FIG. 42. FIG. 44 is a diagram illustrating the bottom surface of the steering device according to the seventh embodiment. In addition, the same reference signs will be given to the same components as those of the above-described embodiments, and the repetitive description thereof will not be presented.

Figure 45:
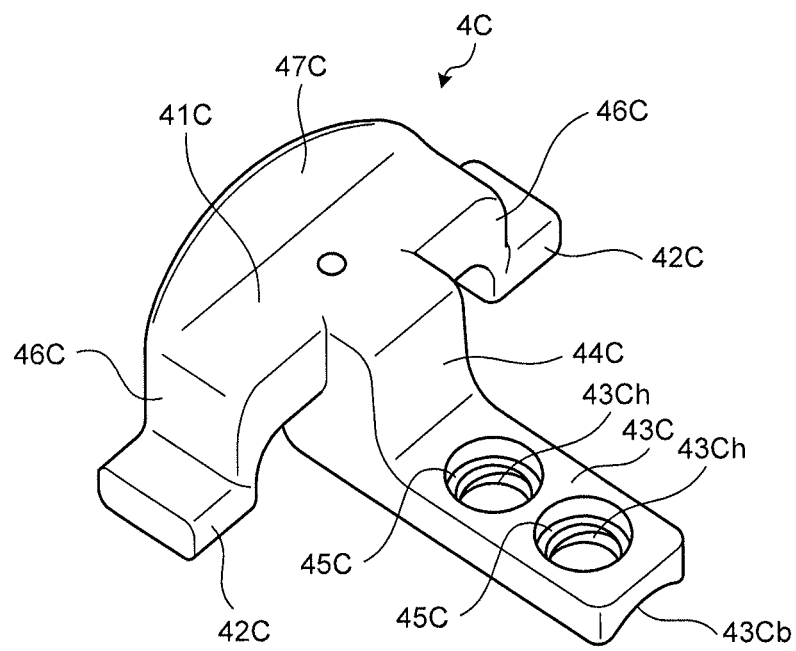
FIG. 45 is a perspective view illustrating an inner column bracket according to the seventh embodiment.

As illustrated in FIGS. 43 and 44, the steering device 100 includes an inner column bracket 4C. FIG. 45 is a perspective view illustrating the inner column bracket according to the seventh embodiment. As illustrated in FIG. 45, the inner column bracket 4C includes, for example, an arm portion 41C, an insertion portion 42C, a neck portion 44C, and a leg portion 43C. For example, the arm portion 41C is, as illustrated in FIG. 44, a rod-shaped portion which connects two pairs of first telescopic friction plates 21 facing each other at both sides of the outer column 54. The insertion portion 42C is a portion which is formed at both ends of the arm portion 41C and is inserted into a hole formed in the first telescopic friction plate 21. The insertion portion 42C is formed so as to be thinner than the arm portion 41C. The neck portion 44C is a portion which is projected from a part of the arm portion 41C in a direction perpendicular to the length direction of the arm portion 41C. The leg portion 43C is a plate-shaped portion, which is provided at the end opposite to the arm portion 41C of the neck portion 44C, and contacts the inner column 51. As illustrated in FIG. 45, an inner column side surface 43Cb of the leg portion 43C has a shape that follows the shape of the outer periphery surface of the inner column 51. Further, the leg portion 43C includes, for example, two circular concave portions 45C in a surface opposite to the surface facing the inner column 51.

As illustrated in FIG. 45, the arm portion 41C includes a curved portion 46C which is curved in a direction moving close to the inner column 51 at a position between the neck portion 44C and the first telescopic friction plate 21. The arm portion 41C includes two curved portions 46C, and two curved portions 46C are disposed at both sides with the neck portion 44C interposed therebetween. Accordingly, the insertion portion 42C is located closer to the inner column 51 than the case where the arm portion 41C does not include the curved portion 46C. Further, the arm portion 41C includes a rib 47C which is projected in a direction perpendicular to the axial direction of the inner column 51. The rib 47C is formed long, for example, in the length direction of the arm portion 41C. Further, as illustrated in FIG. 43, the rib 47C projects from the lower surface of the arm portion 41C and is disposed at the front end of the arm portion 41C. Since the arm portion 41C is provided with the rib 47C, the rigidity of the arm portion 41C is improved.

As illustrated in FIG. 44, the inner column bracket 4C is connected to the first telescopic friction plates 21 which are disposed at both sides of the outer column 54. The inner column bracket 4C is supported by the first telescopic friction plate 21 in a manner such that the insertion portion 42C is inserted into a hole formed in the first telescopic friction plate 21. Further, the first telescopic friction plates 21, disposed at both sides of the outer column 54, face each other making the arm portion 41C of the inner column bracket 4C between the first telescopic friction plates 21. Further, the inner column bracket 4C is connected to the inner column 51 by the leg portion 43C.

In order to detachably connect the inner column bracket 4C and the inner column 51 to each other, as illustrated in FIG. 43, the first hole 51h is opened in the inner column 51 and a second hole 43Ch is opened in the bottom surface of the concave portion 45C of the leg portion 43C. The first hole 51h and the second hole 43Ch communicate with each other. For example, in the seventh embodiment, each of the first hole 51h and the second hole 43Ch is provided at two positions and both holes have the same inner periphery. When the shear pin P is inserted into a position straddling the first hole 51h and the second hole 43Ch, the inner column bracket 4C and the inner column 51 are detachably connected to each other.

Further, the first hole 51h and the second hole 43Ch are disposed at a position where the distance values from the first telescopic friction plates 21 disposed at both sides of the outer column 54 are equal to each other.

Further, the inner column bracket 4C is disposed so that at least a part is fitted into the slit 54s of the outer column 54. Specifically, the leg portion 43C of the inner column bracket 4C is fitted into the slit 54s so as to face the inner wall of the slit 54s. As the material of the inner column bracket 4C, one of aluminum alloy, such as ADC12 is used. ADC12 (described in JIS H 5302) is aluminum alloy which is frequently used in aluminum die-casting, and includes elements of Al (aluminum), Si (silicon), and Cu (copper). Generally, ADC12 has mechanical rigidity and excellent machinability and excellent castability. Therefore, the product may be produced massively at low cost. ADC12 is best suitable as the material of the inner column bracket 4C.

Figure 46:
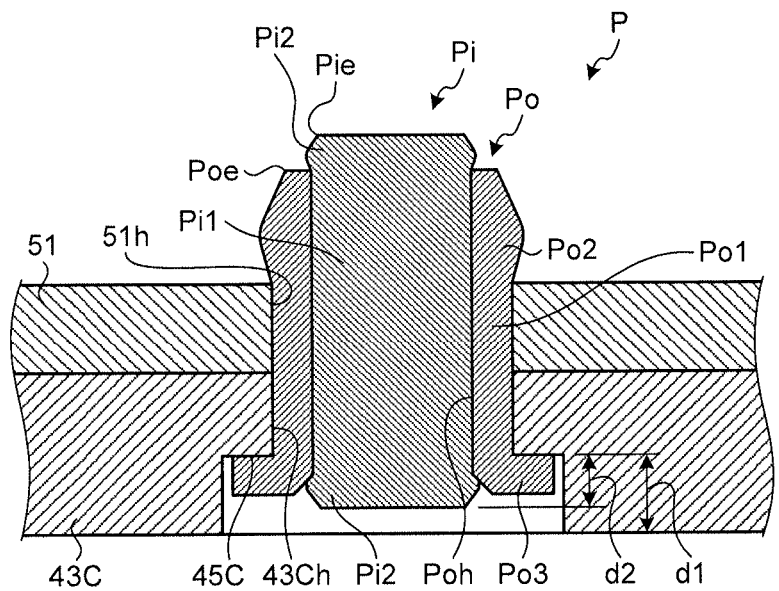
FIG. 46 is an enlarged diagram illustrating the periphery of a shear pin of FIG. 43.
Figure 47:
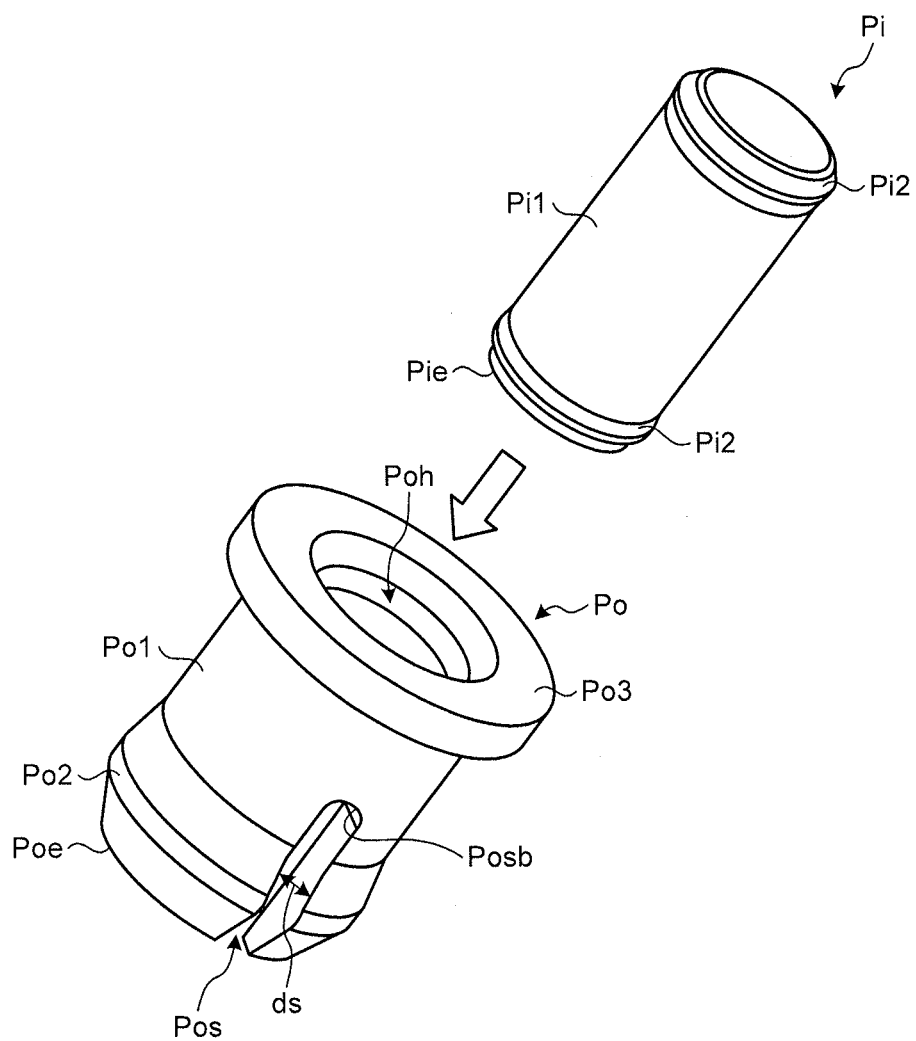
FIG. 47 is a perspective view illustrating the shear pin in a state before an inner pin according to the seventh embodiment is inserted into an outer pin.
Figure 48:
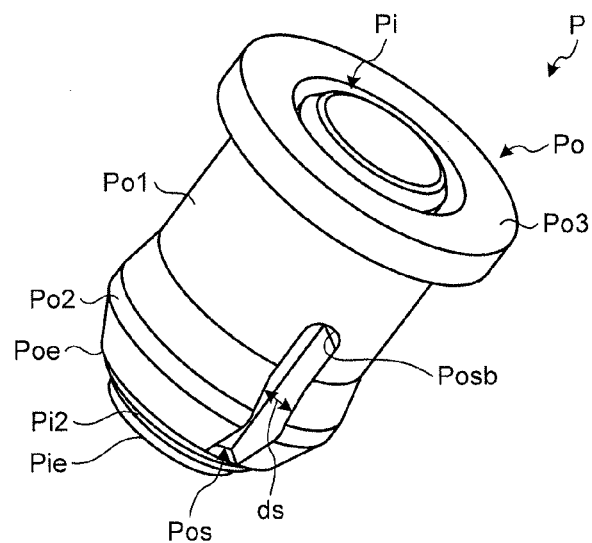
FIG. 48 is a perspective view illustrating the shear pin in a state after the inner pin according to the seventh embodiment is inserted into the outer pin.

FIG. 46 is an enlarged diagram illustrating the periphery of the shear pin of FIG. 43. FIG. 47 is a perspective view illustrating the shear pin in a state before an inner pin according to the seventh embodiment is inserted into an outer pin. FIG. 48 is a perspective view illustrating the shear pin in a state after the inner pin according to the seventh embodiment is inserted into the outer pin. In the seventh embodiment, the shear pin P includes an outer pin Po and an inner pin Pi. The outer pin Po and the inner pin Pi are formed of, for example, a resin such as polyacetal.

Figure 8:
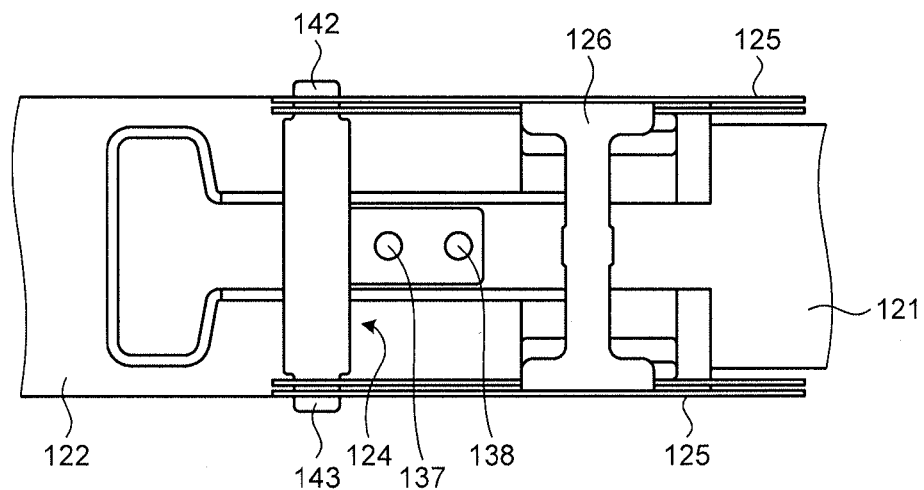
FIG. 8 is a diagram (a bottom view of the steering column apparatus) illustrating a bottom surface of FIG. 7.
Figure 9:
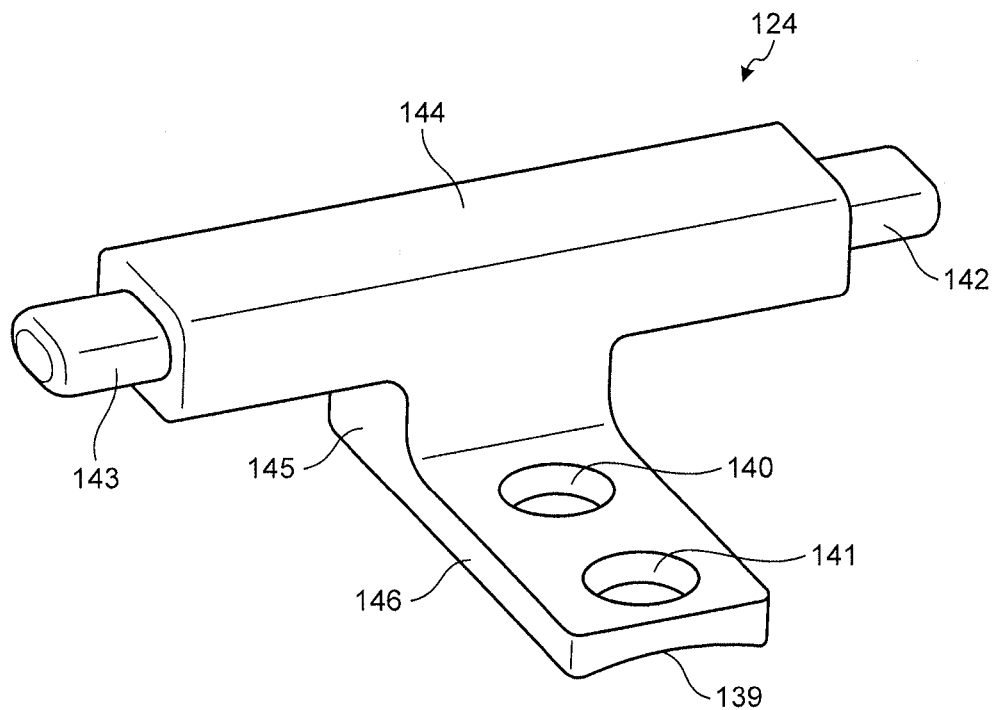
FIG. 9 is a perspective view illustrating a fixed bracket according to the first embodiment.
Figure 10:
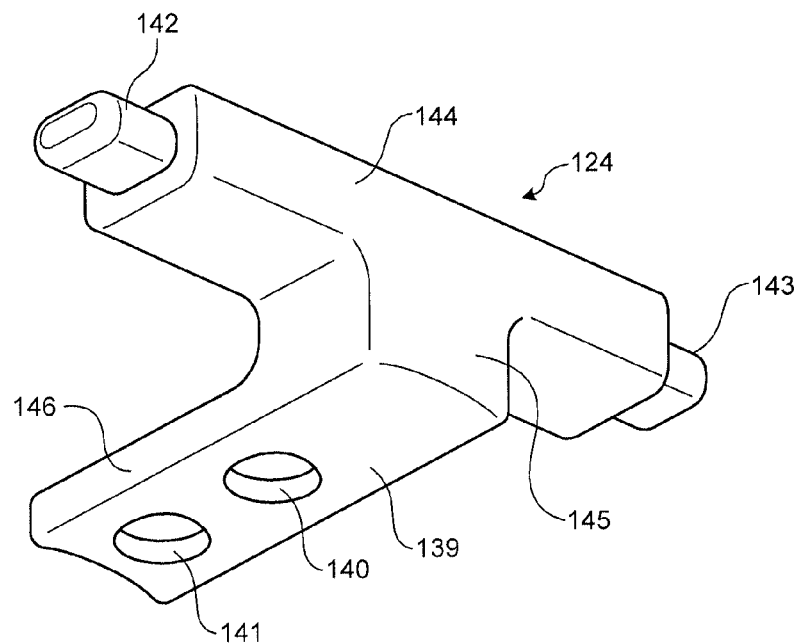
FIG. 10 is a perspective view illustrating the fixed bracket according to the first embodiment.
Figure 11:
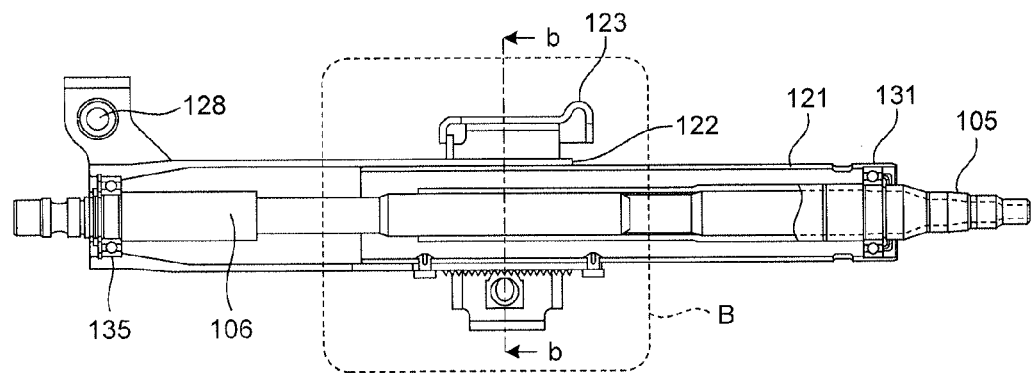
FIG. 11 is a diagram illustrating a side surface (a part of a cross section) of the steering column apparatus of the second embodiment.
Figure 12:
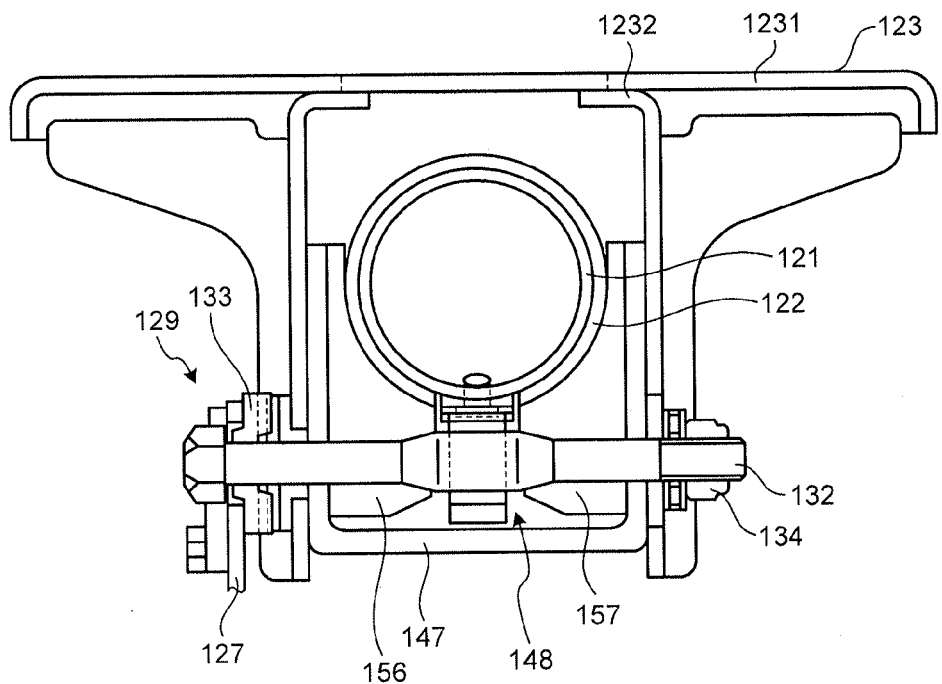
FIG. 12 is a cross-sectional view taken along the line b-b of FIG. 11.
Figure 13:
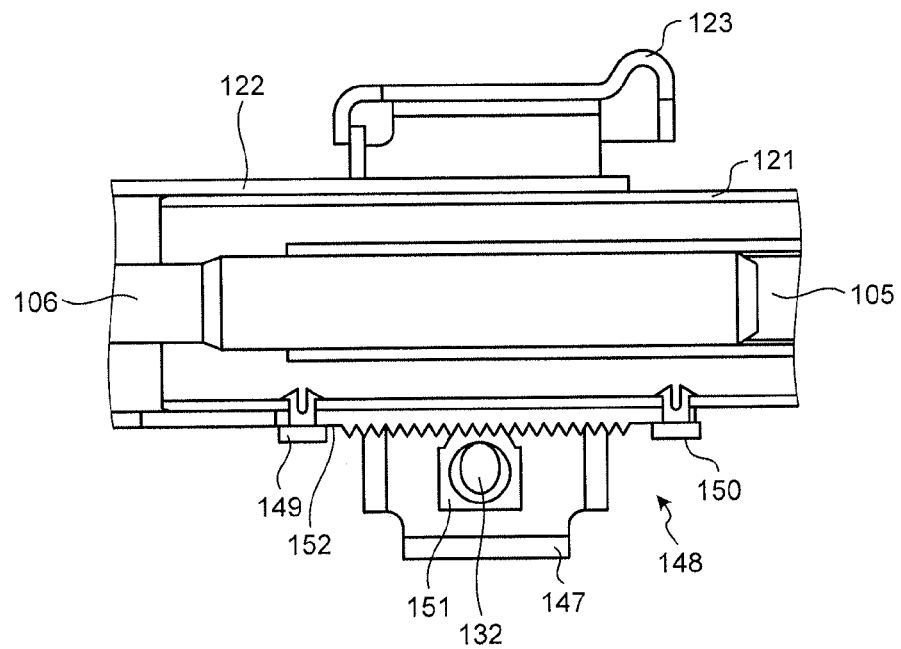
FIG. 13 is an enlarged diagram illustrating a part B of FIG. 11.
Figure 14:
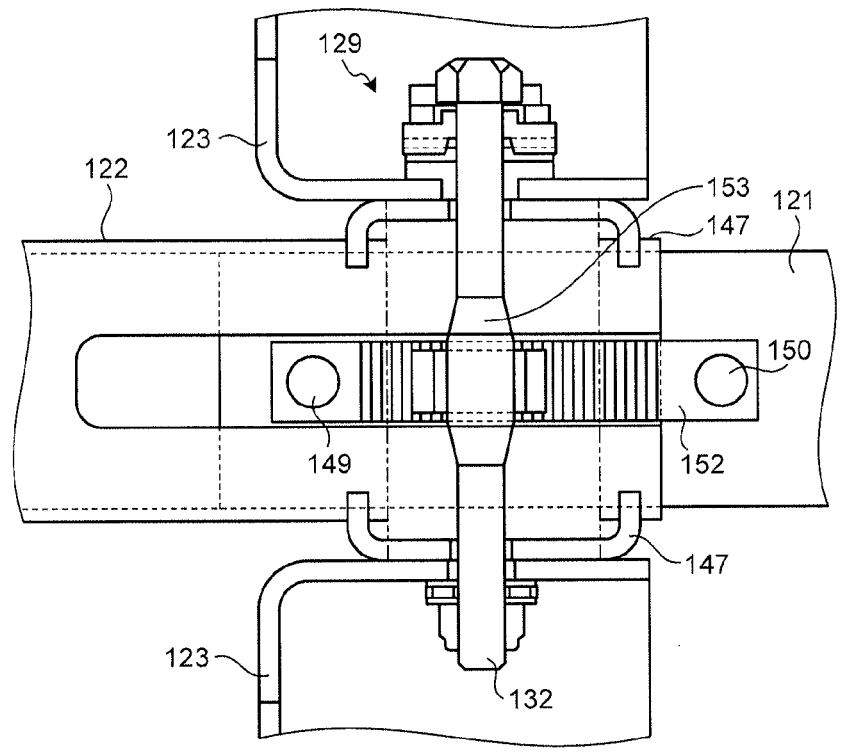
FIG. 14 is a diagram (a bottom view of the steering column apparatus) illustrating a bottom surface of FIG. 11.
Figure 15:
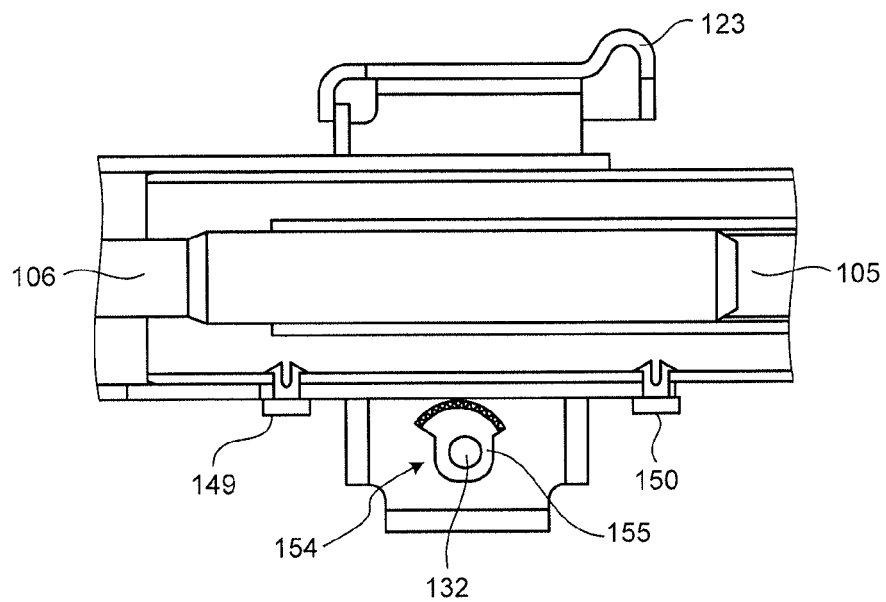
FIG. 15 is a diagram similar to FIG. 13 illustrating a modified example of the second embodiment.
Figure 16:
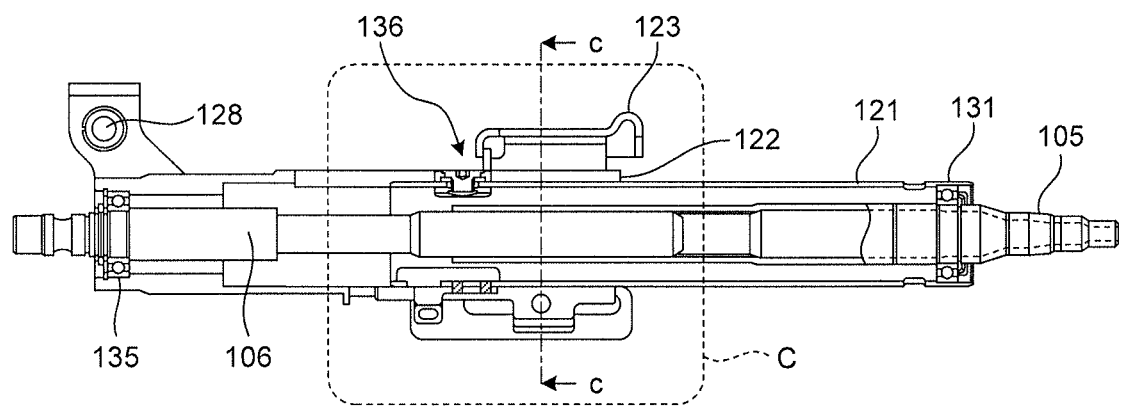
FIG. 16 is a diagram illustrating a side surface (a part of a cross section) of the steering column apparatus of the third embodiment.
Figure 17:
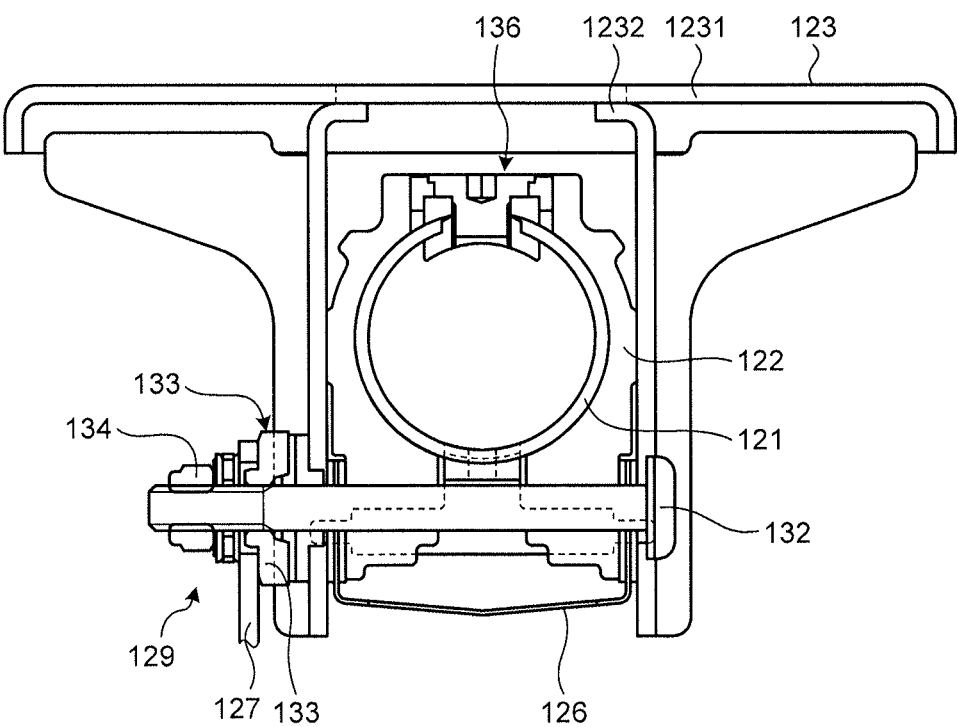
FIG. 17 is a cross-sectional view taken along the line c-c of FIG. 16.
Figure 18:
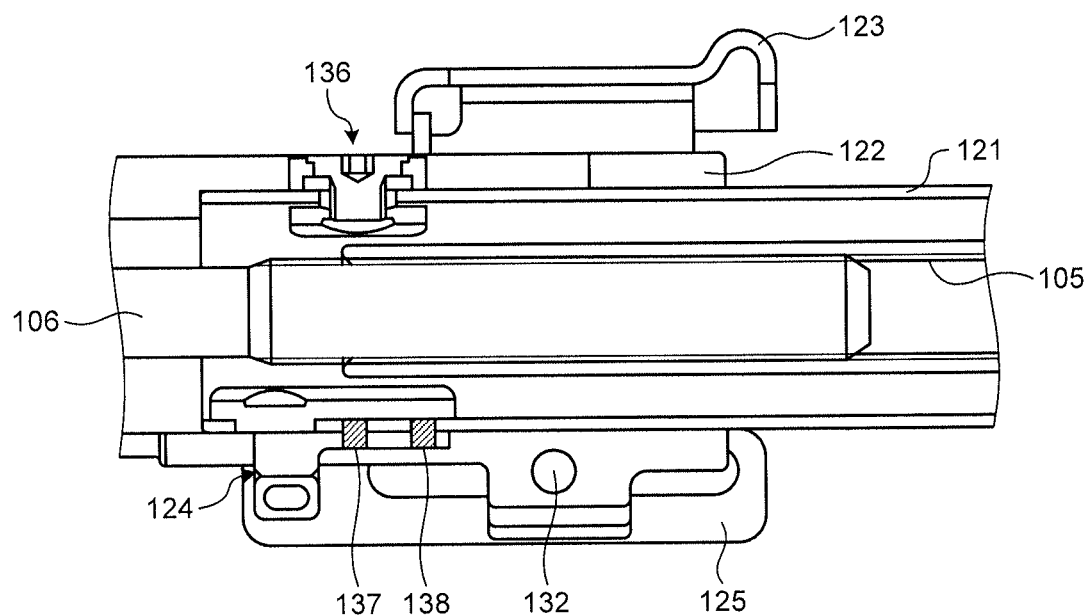
FIG. 18 is an enlarged diagram illustrating a part C of FIG. 16.
Figure 19:
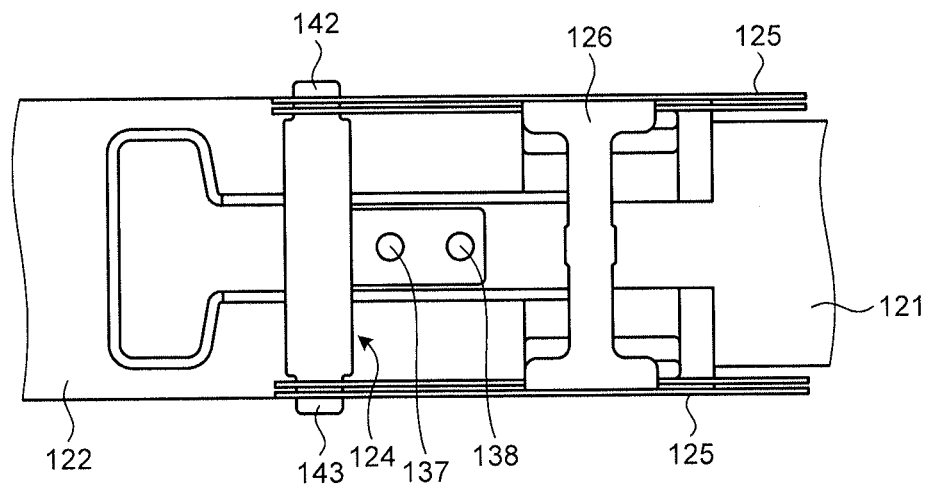
FIG. 19 is a diagram (a bottom view of the steering column apparatus) illustrating a bottom surface of FIG. 16.
Figure 20A:
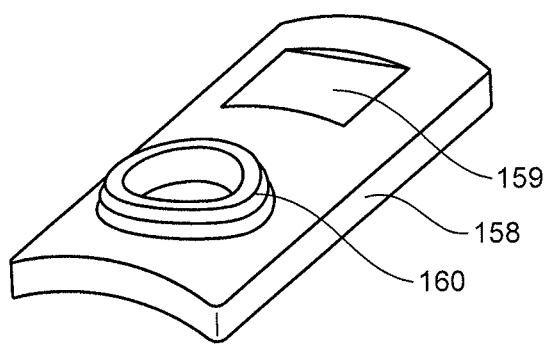
FIGS. 20A and 20B are a diagram illustrating an inner plate according to the third embodiment.
Figure 20B:
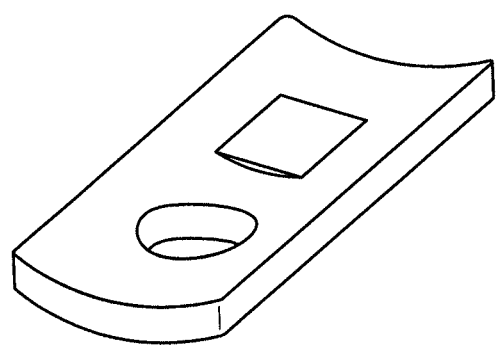
Figure 21A:
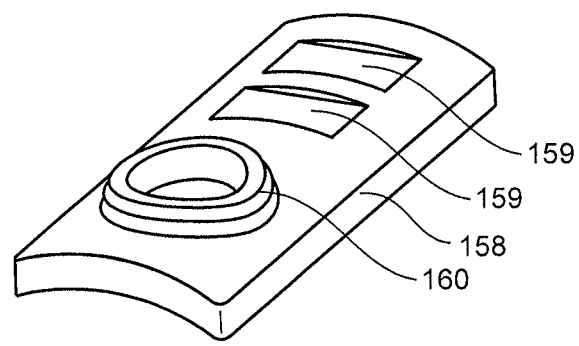
FIGS. 21A and 21B are a diagram illustrating an inner plate according to a modified example of the third embodiment.
Figure 21B:
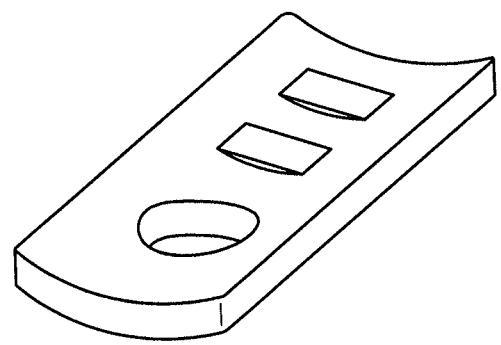
Figure 23A:
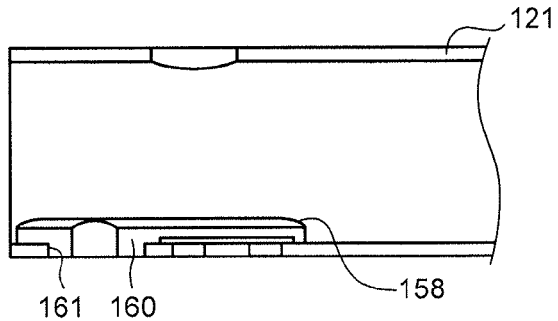
FIGS. 23A, 23B, 23C and 23D are a diagram illustrating an inner plate attachment method according to the third embodiment.
Figure 23B:
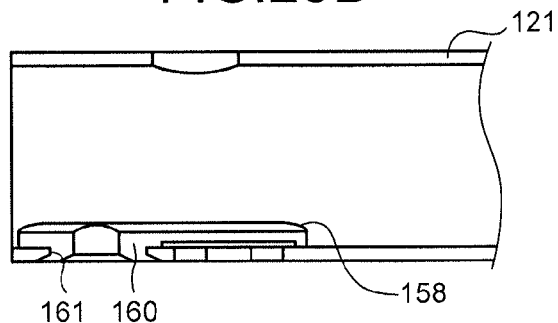
Figure 23C:
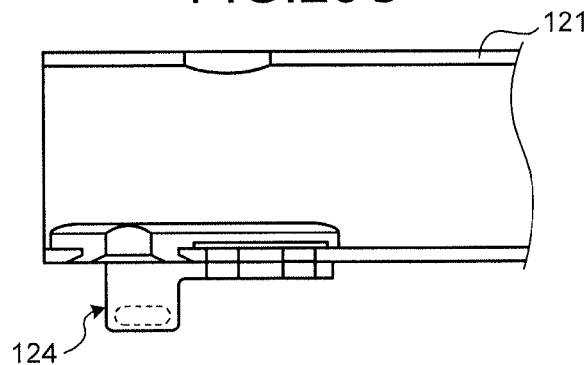
Figure 23D:
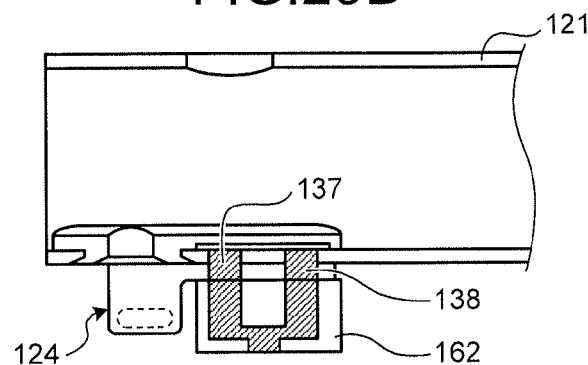

As illustrated in FIG. 46, the outer pin Po is a cylindrical member that is inserted through the first hole 51h and the second hole 43Ch. The outer pin Po includes, for example, a main body portion Po1, a separation preventing portion Po2, a flange portion Po3, and a guide hole Poh. As illustrated in FIGS. 46 and 8, the main body portion Po1 has a cylindrical shape and is inserted through the first hole 51h and the second hole 43Ch. The separation preventing portion Po2 is provided at one end of the main body portion Po1 and is located at the inside of the inner column 51. The separation preventing portion Po2 has a cylindrical shape and has an outer periphery larger than the inner periphery of the first hole 51h and the inner periphery of the second hole 43Ch. Accordingly, since the separation preventing portion Po2 contacts the inner periphery surface of the inner column 51, the separation of the outer pin Po from the first hole 51h and the second hole 43Ch is suppressed. The flange portion Po3 is provided at the other end of the main body portion Po1 and is located at the outside of the second hole 43Ch in the radial direction of the inner column 51. The flange portion Po3 has, for example, a disk shape and has an outer periphery larger than the inner periphery of the first hole 51h and the inner periphery of the second hole 43Ch. Accordingly, since the flange portion Po3 contacts the bottom surface of the concave portion 45C, the separation of the outer pin Po from the first hole 51h and the second hole 43Ch is suppressed. The guide hole Poh is a penetration hole which is inserted through an area from the flange portion Po3 to the separation preventing portion Po2.

In the seventh embodiment, the outer pin Po is inserted into the first hole 51h and the second hole 43Ch by press-inserting. Since the outer pin Po is inserted into the first hole 51h and the second hole 43Ch, the first hole 51h and the second hole 43Ch are positioned. For example, the separation preventing portion Po2 is inserted from the second hole 43Ch into the first hole 51h and the second hole 43Ch. The separation preventing portion Po2 is formed so that the outer periphery at the end Poe, which is opposite to the main body portion Po1, becomes smaller than the inner periphery of the first hole 51h and the inner periphery of the second hole 43Ch. Accordingly, the separation preventing portion Po2 may be easily inserted into the second hole 43Ch. In addition, the outer pin Po may be inserted into the first hole 51h and the second hole 43Ch from the first hole 51h. Further, the outer pin Po may be press-inserted after a rib or the like is provided in the outer wall of the main body portion Po1.

As illustrated in FIGS. 47 and 48, the outer pin Po includes one notch Pos which is formed from the separation preventing portion Po2 toward the flange portion Po3. When the separation preventing portion Po2 is inserted into the second hole 43Ch, the width ds of the notch Pos in the circumferential direction of the outer pin Po decreases, and hence the outer periphery of the separation preventing portion Po2 decreases. Accordingly, the separation preventing portion Po2 is easily inserted through the first hole 51h and the second hole 43Ch. In the description below, the width ds of the notch Pos in the circumferential direction of the outer pin Po is simply referred to as the width ds of the notch Pos. In addition, the outer pin Po may include a plurality of notches Pos. Here, it is desirable to dispose the plurality of notches Pos at the same interval in the circumferential direction of the outer pin Po.

In a state before the outer pin Po is inserted through the first hole 51h and the second hole 43Ch, the outer periphery of the main body portion Po1 is larger than the inner periphery of the first hole 51h and the inner periphery of the second hole 43Ch. Then, in a state where the outer pin Po is inserted into the first hole 51h and the second hole 43Ch, the outer periphery of the main body portion Po1 is the same as the inner periphery of the first hole 51h and the inner periphery of the second hole 43Ch. Accordingly, the main body portion Po1 urges the inner wall of the first hole 51h and the inner wall of the second hole 43Ch. For this reason, a gap is not easily formed between the main body portion Po1 and the inner wall of the first hole 51h and a gap is not formed between the main body portion Po1 and the inner wall of the second hole 43Ch. Accordingly, the play of the outer pin Po is suppressed.

The inner pin Pi is a member that penetrates the guide hole Poh and urges the inner wall of the guide hole Poh outward in the radial direction of the guide hole Poh. In the description below, the outside in the radial direction of the guide hole Poh will be simply referred to as the outside in the radial direction. The inner pin Pi includes, for example, a body portion Pi1 and a large diameter portion Pi2. As illustrated in FIGS. 46 and 47, the body portion Pi1 has a columnar shape and is inserted through the guide hole Poh. The large diameter portion Pi2 is provided at both ends of the body portion Pi1 and is located at the outside of the guide hole Poh. The large diameter portion Pi2 has an outer periphery larger than the inner periphery of the guide hole Poh. Accordingly, since the large diameter portions Pi2 contact the edges of both ends of the guide hole Poh, it is possible to suppress the inner pin Pi from coming off from the outer pin Po. In addition, both ends of the guide hole Poh may be provided with a stepped portion of which the inner periphery is enlarged. In this case, since the large diameter portion Pi2 contacts the edge of the stepped portion, the inner pin Pi may not be easily projected from both ends of the guide hole Poh.

In the seventh embodiment, the inner pin Pi is inserted into the guide hole Poh by press-inserting. For example, the large diameter portion Pi2 is inserted from the flange portion Po3 into the guide hole Poh. The large diameter portion Pi2 is formed so that the outer periphery at the end Pie, which is opposite to the body portion Pi1, becomes smaller than the inner periphery of the outer pin Po. Accordingly, the large diameter portion Pi2 is easily inserted into the guide hole Poh. Further, since both ends of the inner pin Pi are provided with the same large diameter portion Pi2, the inner pin can be inserted from any end into the guide hole Poh. Accordingly, the shear pin P may be easily assembled.

In a state before the inner pin Pi is inserted into the guide hole Poh, the outer periphery of the body portion Pi1 is larger than the inner periphery of the guide hole Poh. Then, in a state where the inner pin Pi is inserted through the guide hole Poh, the outer periphery of the body portion Pi1 is the same as the inner periphery of the guide hole Poh. Accordingly, the body portion Pi1 urges the inner wall of the guide hole Poh. For this reason, a gap is not easily formed between the body portion Pi1 and the inner wall of the guide hole Poh. Accordingly, the play of the inner pin Pi is suppressed.

Since the body portion Pi1 urges the inner wall of the guide hole Poh outward in the radial direction, a force of widening the width ds of the notch Pos is applied to the outer pin Po. Accordingly, a force in which the outer pin Po urges the inner wall of the first hole 51h and the inner wall of the second hole 43Ch outward in the radial direction increases. Further, since the body portion Pi1 urges the inner wall of the guide hole Poh outward in the radial direction, the width ds of the notch Pos in the separation preventing portion Po2 increases. Accordingly, the outer periphery of the separation preventing portion Po2 increases. For this reason, the shear pin P which is obtained by integrating the outer pin Po and the inner pin Pi with each other is fixed to a position straddling the first hole 51h and the second hole 43Ch, and hence the inner column 51 and the inner column bracket 4C are connected to each other.

Further, since the steering device 100 according to the seventh embodiment uses the shear pin P in the first hole 51h and the second hole 43Ch, there is no need to provide a device for injecting a resinous member and a member for receiving the resinous member compared to the case where the resinous member is injected into the first hole 51h and the second hole 43Ch. For this reason, the steering device 100 according to the seventh embodiment may be easily assembled.

When an excessive load is applied to the steering wheel 81, the load is transmitted to the inner column 51 through the input shaft 82a, and hence the inner column 51 is moved forward. Meanwhile, the inner column bracket 4C which is supported by the first telescopic friction plate 21 does not move. For this reason, since a shearing force is applied to the shear pin P, the shear pin P is cut when the load exceeds the allowable shearing force of the shear pin P. When the shear pin P is cut, the connection between the inner column 51 and the inner column bracket 4C is released. When the connection between the inner column 51 and the inner column bracket 4C is released, the inner column 51 is supported in the axial direction by a friction force generated between the inner column 51 and the outer column 54. Thus, when an excessive load is applied to the steering wheel due to the collision of the operator with respect to the steering wheel 81, a force for moving the inner column 51 decreases immediately after the excessive load is applied to the steering wheel, and hence impact is absorbed.

Further, even when the shear pin P is cut, the outer column 54 is supported by the outer column bracket 52 fixed to the vehicle body side member 13. Further, the inner column 51 is supported by the outer column 54. For this reason, even when the shear pin P is cut, the steering column 50 does not drop.

Figure 49:
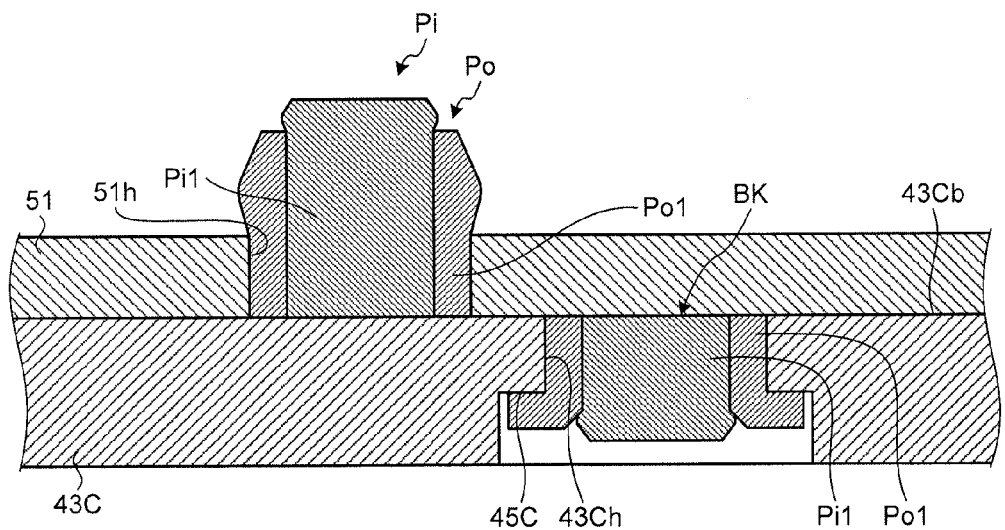
FIG. 49 is a diagram illustrating the cut shear pin.

FIG. 49 is a diagram illustrating a state where the shear pin is cut. As illustrated in FIG. 49, the shear pin P is cut at the cut surface BK. The cut surface BK corresponds to the outer periphery surface of the inner column 51, that is, an inner column side surface 43Cb of the leg portion 43C. The outer pin Po is cut at the main body portion Po1, and the inner pin Pi is cut at the body portion Pi1. For this reason, the allowable shearing force of the shear pin P depends on the cross-sectional area of the main body portion Po1 and the cross-sectional area of the body portion Pi1 at the cut surface BK.

Figure 50:
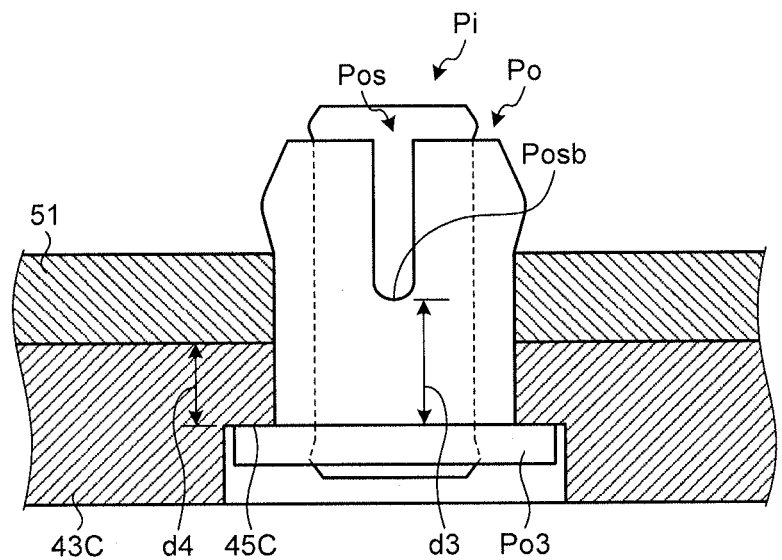
FIG. 50 is an enlarged diagram illustrating the periphery of the shear pin of FIG. 43 while only illustrating the shear pin as a side view.

FIG. 50 is an enlarged diagram illustrating the periphery of the shear pin of FIG. 43 while only illustrating the shear pin as a side view. As illustrated in FIG. 50, it is desirable that the distance d3 from the flange portion Po3 to the front end Posb of the notch Pos be larger than the distance d4 from the flange portion Po3 to the outer wall of the inner column 51. Accordingly, the notch Pos is not included in the cut surface BK used for cutting the shear pin P. For this reason, since a loss portion corresponding to the notch Pos disappears in the cross section of the main body portion Po1 in the cut surface BK, unevenness in the allowable shearing force of the shear pin P is suppressed.

Further, it is desirable that the inner column 51 moves straight in the axial direction after the shear pin P is cut. When the movement direction of the inner column 51 forms an angle with respect to the axial direction of the outer column 54, the movement of the inner column 51 may be disturbed or a friction force generated between the inner column 51 and the outer column 54 may become larger than a predetermined value.

In the seventh embodiment, as illustrated in FIG. 44, the inner column bracket 4C is bonded to the first telescopic friction plates 21 disposed at both sides of the outer column 54. Accordingly, when an axial load is applied to the inner column bracket 4C, a tightening force is applied to the inner column bracket 4C from both sides of the outer column 54. For this reason, when the shear pin P is cut, the posture of the inner column bracket 4C is stabilized. Thus, when the inner column starts to move, the posture of the inner column 51 is maintained to be straight in the axial direction. Accordingly, the inner column 51 is likely to move straight in the axial direction.

Further, the first telescopic friction plates 21 are disposed facing each other at both sides of the inner column bracket 4C which is interposed between the first telescopic friction plates 21, and the first hole 51h and the second hole 43Ch are disposed at a position where the distance values from both of the first telescopic friction plates 21 are equal. Accordingly, when an axial load is applied to the inner column bracket 4C, a tightening force is applied from both sides of the outer column 54 to the inner column bracket 4C more equally. Accordingly, it is possible to stabilize the posture of the inner column bracket 4C when the shear pin P is cut. Thus, when the inner column 51 starts to move, the posture of the inner column 51 is likely to be maintained to be straighter in the axial direction. Thus, the inner column 51 is likely to move more straight in the axial direction.

Further, even when the inner column bracket 4C may not receive a tightening force from both sides of the outer column 54 equally, since the leg portion 43C of the inner column bracket 4C is fitted into the slit 54s facing the inner wall of the slit 54s, the inner column bracket 4C is guided by the slit 54s. Accordingly, it is possible to stabilize the posture of the inner column bracket 4C when the shear pin P is cut.

Further, as illustrated in FIG. 46, it is preferable that the depth d1 of the concave portion 45C is equal to or larger than the length d2 of the portion of the shear pin P which projects from the second hole 43Ch. Accordingly, the shear pin P does not project from the surface of the inner column bracket 4C. This will decrease the possibility that the shear pin P may be broken by an external force.

In addition, the allowable shearing force of the shear pin P may be adjusted by changing the number of the first holes 51h and the second holes 43Ch, the cross-sectional areas of the first hole 51h and the second hole 43Ch, and the material of the shear pin P. For example, each of the first hole 51*h* and the second hole 43Ch may be provided at one position or three or more positions. Further, the shear pin P may be formed of, for example, metal including non-ferrous metal or rubber.

A diagram illustrating a relation between a displacement amount of a steering column and a load necessary to move the steering column of the seventh embodiment is the same as FIG. 33.

In the seventh embodiment, the inner column 51 is supported in the axial direction by a first friction force generated between the inner column and the outer column 54 by the tightening of the outer column bracket 52 and a second friction force generated between the first telescopic friction plate 21 and the member (the outer column bracket 52, the second telescopic friction plate 22, and the outer column 54) contacting the first telescopic friction plate 21. The force F1 illustrated in FIG. 33 indicates the first friction force, and the force F3 indicates the sum of the first friction force and the second friction force. Further, the force F2 illustrated in FIG. 33 indicates the allowable shearing force of the shear pin P. The force F2 is smaller than the force F3 and is larger than the force F1.

In the seventh embodiment, when a load of the force F2 or more is applied to the inner column 51, the shear pin P is cut and the inner column 51 is separated from the inner column bracket 4C. Accordingly, since the connection between the inner column 51 and the first telescopic friction plate 21 is released, the second friction force is not applied to the inner column 51. For this reason, the inner column 51 moves in the axial direction while absorbing an impact by the first friction force after the shear pin P is cut. In the steering device 100 according to the seventh embodiment, when the first friction force is set to be small, the inner column 51 moves smoothly, and hence the operator may be easily protected from a secondary collision.

In the seventh embodiment, even when the setting value of the first friction force is small, the second friction force may compensate a degree in which the first friction force decreases among the force supporting the inner column 51 in the axial direction. For this reason, since the steering device 100 according to the seventh embodiment adjusts the setting value of the first friction force and the setting value of the second friction force, it is possible to suppress the inner column 51 from moving by the load applied in normal use and to more easily protect the operator from the secondary collision.

As described above, the steering device 100 according to the seventh embodiment includes the cylindrical inner column 51, which rotatably supports the input shaft 82*a* connected to the steering wheel 81 and has the first hole 51*h* opened therein, and the outer column 54, which is formed in a cylindrical shape for inserting at least a part of the inner column 51 thereinto and has the slit 54*s* formed by notching one insertion end of the inner column 51. Further, the steering device 100 includes the outer column bracket 52, which is fixed to the vehicle body side member 13 so as to support the outer column 54 and tightens the outer column 54 along with the telescopic friction plate (the first telescopic friction plate 21) as the plate material. Further, the steering device 100 includes the inner column bracket 4C, which is supported by the telescopic friction plate (the first telescopic friction plate 21) and has the second hole 43Ch opened therein. Further, the steering device 100 includes the shear pin P, which is provided at a position straddling the first hole 51*h* and the second hole 43Ch so as to detachably connect the inner column 51 and the inner column bracket 4C to each other. The telescopic friction plate (the first telescopic friction plate 21) is disposed at both sides of the outer column 54. The inner column bracket 4C includes the arm portion 41C which connects the telescopic friction plates (the first telescopic friction plates 21) disposed at both sides of the outer column 54, the neck portion 44C which is projected from the arm portion 41C in a direction perpendicular to the length direction of the arm portion 41C, and the leg portion 43C which is provided at the end opposite to the arm portion 41C of the neck portion 44C and contacts the inner column 51.

Accordingly, in the steering device 100 according to the seventh embodiment, when an excessive load is applied to the steering wheel 81, the load is transmitted to the inner column 51 through the input shaft 82*a*, and hence the inner column 51 is moved forward. Meanwhile, the inner column bracket 4C which is supported by the first telescopic friction plate 21 does not move. For this reason, since a shearing force is applied to the shear pin P, the shear pin P is cut when the load exceeds the allowable shearing force of the shear pin P. When the shear pin P is cut, the connection between the inner column 51 and the inner column bracket 4C is released. When the connection between the inner column 51 and the inner column bracket 4C is released, the inner column 51 is supported in the axial direction by a friction force generated between the inner column 51 and the outer column 54. For this reason, the inner column 51 of the steering column 50 may move toward the front side of the vehicle body. Further, even when the shear pin P is cut, the outer column 54 is supported by the outer column bracket 52 fixed to the vehicle body side member 13. Further, the inner column 51 is supported by the outer column 54. For this reason, even when the shear pin P is cut, the steering column 50 does not drop. Thus, the steering device 100 according to the seventh embodiment may prevent a problem in which the steering column 50 is dropped by an erroneous operation, even when the setting value (the allowable shearing force of the shear pin P) of the separation load, in which the steering column 50 moves toward the front side of the vehicle body, is decreased.

Further, when an axial load is applied to the inner column bracket 4C, a tightening force is applied from both sides of the outer column 54 to the inner column bracket 4C. For this reason, it is possible to stabilize the posture of the inner column bracket 4C when the shear pin P is cut. Thus, when the inner column starts to move, the posture of the inner column 51 is likely to be maintained to be straight in the axial direction. Accordingly, since the inner column 51 is likely to move straight in the axial direction, it is possible to prevent a problem in which the movement of the inner column 51 is disturbed or a problem in which a friction force generated between the inner column 51 and the outer column 54 becomes larger than a predetermined value.

Further, in the steering device 100 according to the seventh embodiment, the arm portion 41C includes a curved portion 46C which curves in a direction approaching the inner column 51 at a position between the neck portion 44C and the first telescopic friction plate 21. Accordingly, the bonding portion (the insertion portion 42C) between the arm portion 41C and the first telescopic friction plate 21 is located close to the inner column 51. This construction decreases the distance in a direction perpendicular to the axial direction of the inner column 51, which is from the bonding portion (the insertion portion 42C) of the arm portion 41C and the first telescopic friction plate 21 to the cut surface BK used for cutting the shear pin P. Thus, since a moment force is not applied to the inner column bracket 4C when the shear pin P is cut, it is possible to stabilize the posture of the inner column bracket 4C when the shear pin P is cut.

Further, in the steering device 100 according to the seventh embodiment, the arm portion 41C includes the rib 47C which is projected in a direction perpendicular to the axial direction of the inner column 51. Accordingly, the rigidity of the arm portion 41C is improved. For this reason, even when a moment force is applied to the inner column bracket 4C, the deformation of the inner column bracket 4C is suppressed. Thus, it is possible to stabilize the posture of the inner column bracket 4C when the shear pin P is cut.

Further, in the steering device 100 according to the seventh embodiment, the shear pin P includes the outer pin Po and the inner pin Pi. The outer pin Po is a cylindrical member having the guide hole Poh formed by penetrating an area from one end to the other end thereof, and is inserted through the first hole 51$h$ and the second hole 43Ch. The inner pin Pi is inserted through the guide hole Poh and urges the inner wall of the guide hole Poh outward in the radial direction of the guide hole Poh. Accordingly, since the steering device 100 may be assembled in a manner such that the first hole 51$h$ and the second hole 43Ch are positioned by the outer pin Po and the inner pin Pi is inserted thereinto, the steering device may be assembled facilely.

Further, in the steering device 100 according to the seventh embodiment, the outer pin Po includes the cylindrical main body portion Po1 which is inserted through the first hole 51$h$ and the second hole 43Ch, the separation preventing portion Po2 which is provided at one end of the main body portion Po1 and has an outer periphery larger than the inner periphery of the first hole 51$h$ and the inner periphery of the second hole 43Ch, and the notch Pos which is formed from the separation preventing portion Po2 toward the other end of the main body portion Po1. Accordingly, when the separation preventing portion Po2 is inserted into the first hole 51$h$ or the second hole 43Ch, the width ds of the notch Pos in the circumferential direction of the outer pin Po decreases, and hence the outer periphery of the separation preventing portion Po2 decreases. Accordingly, the separation preventing portion Po2 may be easily inserted through the first hole 51$h$ and the second hole 43Ch. For this reason, the outer pin Po may be facilely attached to the first hole 51$h$ and the second hole 43Ch.

Further, in the steering device 100 according to the seventh embodiment, the outer pin Po includes the flange portion Po3 which is provided at the other end of the main body portion Po1 and has an outer periphery larger than the inner periphery of the first hole 51$h$ and the inner periphery of the second hole 43Ch. The distance d3 from the flange portion Po3 to the front end Posb of the notch Pos is larger than the distance d4 from the flange portion Po3 to the outer wall of the inner column 51. Accordingly, the notch Pos is not included in the cut surface BK used for cutting the shear pin P. For this reason, a loss portion corresponding to the notch Pos disappears in the cross section of the main body portion Po1 of the cut surface BK. Thus, the steering device 100 according to the seventh embodiment may easily suppress unevenness in the allowable shearing force of the shear pin P.

Further, in the steering device 100 according to the seventh embodiment, the inner pin Pi includes the columnar body portion Pi1, which urges the inner wall of the guide hole Poh outward in the radial direction of the guide hole Poh, and the large diameter portion Pi2, which is provided at both ends of the body portion Pi1 and has an outer periphery larger than the inner periphery of the guide hole Poh. Accordingly, since the large diameter portion Pi2 contacts the edges of both ends of the guide hole Poh, it is possible to suppress the inner pin Pi from coming off from the outer pin Po.

Further, in the steering device 100 according to the seventh embodiment, the inner column bracket 4C includes the concave portion 45C at the surface opposite to the inner column side surface 43Cb facing the inner column 51. The second hole 43Ch is opened in a part of the bottom surface of the concave portion 45C, and the depth d1 of the concave portion 45C is equal to or larger than the length d2 of the portion projected from the second hole 43Ch of the shear pin P. Accordingly, the shear pin P is not projected from the surface of the inner column bracket 4C. For this reason, the possibility that the shear pin P may be broken by an external force decreases.

Further, in the steering device 100 according to the seventh embodiment, the telescopic friction plate (the first telescopic friction plate 21) is disposed at both sides of the outer column 54. Accordingly, when an axial load is applied to the inner column bracket 4C, a tightening force is applied to the inner column bracket 4C from both sides of the outer column 54. For this reason, it is possible to stabilize the posture of the inner column bracket 4C when the shear pin P is cut. Thus, the posture of the inner column 51 when the inner column starts to move may be easily maintained so as to be straight in the axial direction. Thus, since the inner column 51 is likely to move straight in the axial direction, it is possible to prevent a problem in which the movement of the inner column 51 is disturbed or a problem in which a friction force generated between the inner column 51 and the outer column 54 becomes larger than a predetermined value.

Further, in the steering device 100 according to the seventh embodiment, the telescopic friction plates (the first telescopic friction plates 21), which are disposed at both sides of the outer column 54, are disposed facing each other at both sides of the inner column bracket 4C which is interposed between the first telescopic friction plates 21, and the first hole 51$h$ and the second hole 43Ch are disposed at a position where the distance values from both of the first telescopic friction plates 21 are equal. Accordingly, since a tightening force is applied from both sides of the outer column 54 to the inner column bracket 4C equally when an axial load is applied to the inner column bracket 4C, it is possible to stabilize the posture of the inner column bracket 4C when the shear pin P is cut. Thus, when the inner column 51 starts to move, the posture is maintained to be straight in the axial direction. Thus, since the inner column 51 is likely to move straight in the axial direction, it is possible to prevent a problem in which the movement of the inner column 51 is disturbed or a problem in which a friction force generated between the inner column 51 and the outer column 54 becomes larger than a predetermined value.

Further, in the steering device 100 according to the seventh embodiment, the outer column 54 is located at the front side of the vehicle body, includes the pivot bracket 55, and is formed so that the inner column 51 is inserted thereinto. Accordingly, the axial direction of the outer column 54 may be aligned to the axial direction of the inner column 51. For this reason, the outer column 54 may easily guide the inner column 51 when the inner column 51 moves in the axial direction. Accordingly, since the inner column 51 is likely to move straight in the axial direction, it is possible to prevent a problem in which the movement of the inner column 51 is disturbed or a problem in which a friction force generated between the inner column 51 and the outer column 54 becomes larger than a predetermined value.

Further, as described above, the steering device 100 according to the seventh embodiment is formed by a member connection structure using the shear pin P. The member connection structure includes the first fixed member (the inner column 51) in which the first hole 51$h$ is opened and the second fixed member (the inner column bracket 4C) which is disposed adjacent to the first fixed member (the inner column 51) and in which the second hole 43Ch is opened. Further, the member connection structure includes the shear pin P which connects the first fixed member (the inner column 51) and the second fixed member (the inner column bracket 4C) to each other at a position straddling the first hole 51h and the second hole 43Ch and is cut at the cut surface BK of the boundary portion between the first fixed member (the inner column 51) and the second fixed member (the inner column bracket 4C) by the movement of the first fixed member (the inner column 51) in the event of the secondary collision. The shear pin P includes the outer pin Po, which is a cylindrical member having the guide hole Poh formed by penetrating an area from one end to the other end thereof and is inserted through the first hole 51h and the second hole 43Ch, and the inner pin Pi, which is inserted through the guide hole Poh and urges the inner wall of the guide hole Poh outward in the radial direction of the guide hole Poh. The outer pin Po includes the cylindrical main body portion Pot, which is inserted through the first hole 51h and the second hole 43Ch, the separation preventing portion Po2, which is provided at one end of the main body portion Po1 and has an outer periphery larger than the inner periphery of the first hole 51h and the inner periphery of the second hole 43Ch, and the notch Pos, which is formed from the separation preventing portion Po2 toward the other end of the main body portion Po1. The notch Pos does not overlap the cut surface BK.

Accordingly, the notch Pos is not included in the cut surface BK used for cutting the shear pin P. For this reason, a loss portion corresponding to the notch Pos disappears in the cross section of the main body portion Po1 in the cut surface BK. Thus, the member connection structure according to the seventh embodiment may easily suppress unevenness in the allowable shearing force of the shear pin P.

In addition, the member connection structure may be used not only for the connection between the inner column 51 and the inner column bracket 4C, but also for the connection between the other members. For example, the member connection structure may be used for the connection between the vehicle body side member 13 and the outer column bracket 52. The member connection structure is a member connection structure for connecting detachable members, where the members are connected so that one member (the first fixed member) detaches from the other member (the second fixed member) in the event of the secondary collision. Further, in the seventh embodiment, the separation preventing portion Po2 is projected outward in the radial direction of the guide hole Poh in relation to the outer periphery surface of the main body portion Po1, but may be projected inward in the radial direction of the guide hole Poh in relation to the inner periphery surface of the main body portion Po1.

First Modified Example of Seventh Embodiment

Figure 51:
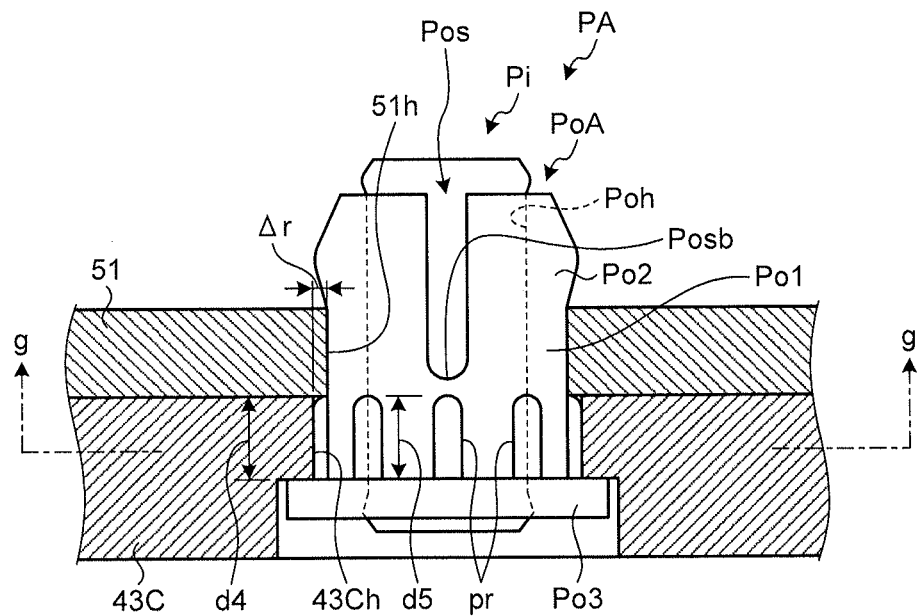
FIG. 51 is an enlarged diagram illustrating the periphery of a shear pin according to a first modified example of the seventh embodiment while only illustrating the shear pin as a side view.
Figure 52:
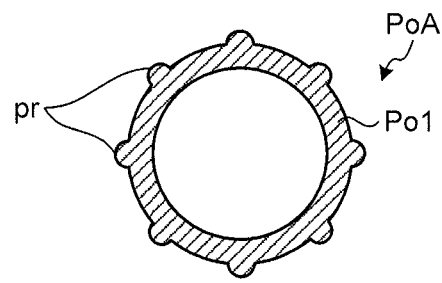
FIG. 52 is a cross-sectional view taken along the line g-g of FIG. 51.

FIG. 51 is an enlarged diagram illustrating the periphery of a shear pin according to a first modified example of the seventh embodiment while only illustrating the shear pin as a side view. FIG. 52 is a cross-sectional view taken along the line g-g of FIG. 51. The first modified example of the seventh embodiment is different from the seventh embodiment in that an outer pin PoA different from the outer pin Po according to the seventh embodiment is provided. In addition, the same reference signs will be given to the same components as those of the above-described embodiments, and the repetitive description thereof will not be presented.

As illustrated in FIG. 51, the outer pin PoA according to the first modified example of the seventh embodiment includes a protrusion pr or protrusions pr in the outer periphery surface of the main body portion Po1. The protrusion pr is an elastically deformable member, and is formed of, for example, rubber. The protrusion pr is formed in, for example, a line shape from the flange portion Po3 toward the separation preventing portion Po2. As illustrated in FIG. 52, the outer pin PoA includes eight protrusions pr. Eight protrusions pr are disposed at the same interval in the circumferential direction of the main body portion Po1. In addition, the number of the protrusions pr of the outer pin PoA may not be eight, but may be seven or less or nine or more.

Even when a gap is formed between the main body portion Po1 and the first hole 51h in a state before the inner pin Pi is inserted into the guide hole Poh, the width ds of the notch Pos increases when the inner pin Pi is inserted into the guide hole Poh, and hence the outer periphery of the portion facing the first hole 51h in the main body portion Po1 increases. For this reason, the gap between the main body portion Po1 and the first hole 51h may be easily filled. On the contrary, when a gap is formed between the main body portion Po1 and the second hole 43Ch in a state before the inner pin Pi is inserted into the guide hole Poh, the outer periphery of the portion facing the second hole 43Ch in the main body portion Po1 hardly increases even when the inner pin Pi is inserted into the guide hole Poh. For this reason, there is a possibility that the gap between the main body portion Po1 and the second hole 43Ch may not be filled.

As illustrated in FIG. 51, when the inner periphery of the second hole 43Ch is larger than the inner periphery of the first hole 51h within the tolerance range, there is a possibility that a gap $\Delta r$ may be formed between the main body portion Po1 and the inner wall of the second hole 43Ch. There is a possibility that the gap $\Delta r$ may cause the play of the shear pin PA. On the contrary, since the outer pin PoA according to the first modified example of the seventh embodiment includes the protrusion pr which is elastically deformable, the protrusion pr may fill the gap $\Delta r$. Accordingly, the protrusion pr may compensate a problem in which the outer periphery of the portion facing the second hole 43Ch in the main body portion Po1 does not increase easily. For this reason, the steering device 100 according to the first modified example of the seventh embodiment may suppress the play of the shear pin PA.

As illustrated in FIG. 51, it is preferable that the length d5 of the protrusion pr is equal to the depth d4 of the second hole 43Ch. Accordingly, even when the inner periphery of the second hole 43Ch is larger than the inner periphery of the first hole 51h within the tolerance range, the gap $\Delta r$ may be filled in the entire length of the depth d4. For this reason, the steering device 100 according to the first modified example of the seventh embodiment may further suppress the play of the shear pin PA. In addition, the length d5 of the protrusion pr may be longer or shorter than the depth d4 of the second hole 43Ch.

As described above, in the steering device 100 according to the first modified example of the seventh embodiment, the outer pin PoA includes the protrusion pr, which is elastically deformable, provided in the outer periphery surface of the main body portion Po1. Accordingly, the protrusion pr may fill a gap between the main body portion Po1 and the inner wall of the first hole 51h or a gap between the main body portion Po1 and the inner wall of the second hole 43Ch. For this reason, the steering device 100 according to the first modified example of the seventh embodiment may suppress the play of the shear pin PA.

Second Modified Example of Seventh Embodiment

Figure 53:
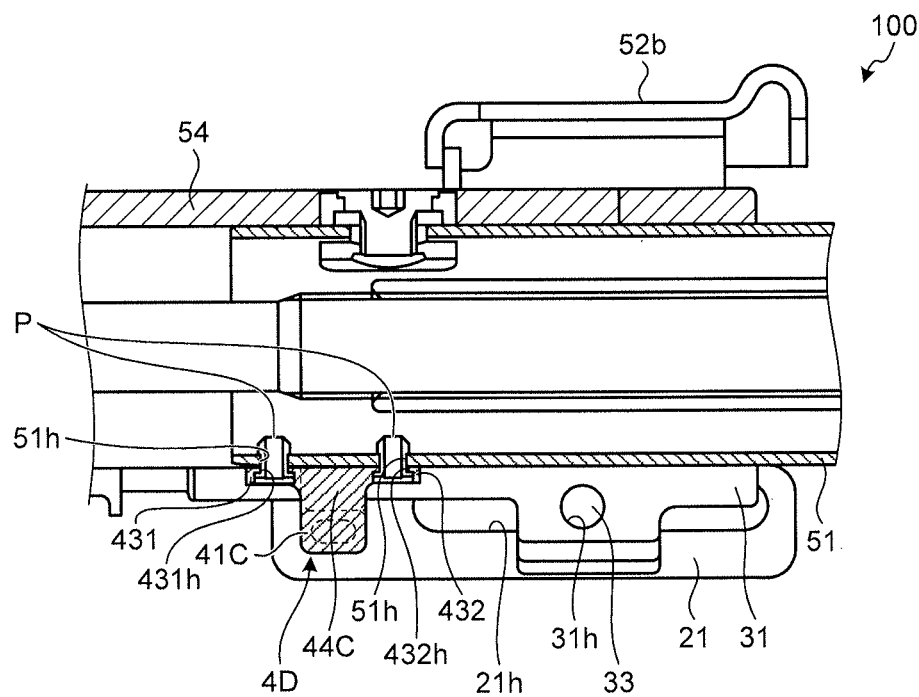
FIG. 53 is a cross-sectional view illustrating a steering device according to a second modified example of the seventh embodiment when taken along the line corresponding to the line f-f of FIG. 42.

FIG. 53 is a cross-sectional view illustrating a steering device according to a second modified example of the seventh embodiment when taken along the line corresponding to the line f-f of FIG. 42. The second modified example of the seventh embodiment is different from the seventh embodiment in that an inner column bracket 4D different from the inner column bracket 4C according to the seventh embodiment is provided. In addition, the same reference signs will be given to the same components as those of the above-described embodiments, and the repetitive description thereof will not be presented.

As illustrated in FIG. 53, the inner column bracket 4D includes a leg portion 431 and a leg portion 432. The leg portion 431 is a plate-shaped portion which is formed forward from the end opposite to the arm portion 41C of the neck portion 44C and contacts the inner column 51. The leg portion 432 is a plate-shaped portion which is formed backward from the end opposite to the arm portion 41C of the neck portion 44C and contacts the inner column 51. The inner column side surfaces of the leg portions 431 and 432 are formed in a shape that follows the shape of the outer periphery surface of the inner column 51. For example, each of the leg portions 431 and 432 includes one circular concave portion 45C in a surface opposite to the surface facing the inner column 51. A second hole 431$h$ is opened in the bottom surface of the concave portion 45C of the leg portion 431. A second hole 432$h$ is opened in the bottom surface of the concave portion 45C of the leg portion 432. The shear pin P is inserted at a position straddling the first hole 51$h$ and the second hole 431$h$ and a position straddling the first hole 51$h$ and the second hole 432$h$, so that the inner column bracket 4D and the inner column 51 are detachably connected to each other.

The inner column bracket 4D includes second holes 431$h$ and 432$h$ which are provided at the front side and the rear side with respect to the arm portion 41C as the support point of the first telescopic friction plate 21. Accordingly, the distance values from the arm portion 41C to the second holes 431$h$ and 432$h$ are shortened compared to the case where two second holes 43$h$ are provided at the rear side of the arm portion 41C as in the seventh embodiment. For this reason, even when a load is applied to the first telescopic friction plate 21 and a moment exerted around the axis parallel to the length direction of the arm portion 41C is transmitted to the inner column bracket 4D, the moment applied to the shear pin P may be easily suppressed.

Further, the inner column bracket 4D may increase the distance between the second holes 431$h$ and 432$h$ compared to the case where two second holes 43Ch are provided at the rear side of the arm portion 41C as in the seventh embodiment. Accordingly, it is possible to stabilize the posture of the inner column bracket 4D when the shear pin P is cut. For this reason, unevenness in the allowable shearing force of the shear pin P may be easily suppressed.

REFERENCE SIGNS LIST 12, 13 VEHICLE BODY SIDE MEMBER
21 FIRST TELESCOPIC FRICTION PLATE
21$h$ TELESCOPIC ADJUSTMENT HOLE
22 SECOND TELESCOPIC FRICTION PLATE
22$a$ FRICTION PORTION
22$b$ CONNECTION PORTION
22$c$ CURVED PORTION
22$h$ ROD PENETRATION HOLE
23$h$ TILT ADJUSTMENT HOLE
31 ROD PENETRATION HOLE
31$h$ ROD PENETRATION HOLE
33 ROD
4, 4B, 4C, 4D INNER COLUMN BRACKET
41, 41C ARM PORTION
42, 42C INSERTION PORTION
43, 43B, 43C, 431, 432 LEG PORTION
43$b$, 43Cb INNER COLUMN SIDE SURFACE
43$h$, 43Ch, 431$h$, 432$h$ SECOND HOLE
44, 44C NECK PORTION
46C CURVED PORTION
47C RIB
50 STEERING COLUMN
51 INNER COLUMN
51$h$ FIRST HOLE
51$ha$ FITTING HOLE
52 OUTER COLUMN BRACKET
52$a$ FRAME-SHAPED SUPPORT PORTION
52$b$ ATTACHMENT PLATE PORTION
52$h$ ATTACHMENT HOLE
53 MANIPULATION LEVER
54 OUTER COLUMN
54$s$ SLIT
55 PIVOT BRACKET
55$a$ ROTATION SHAFT
6, 6A, 6B INNER PLATE
61, 61B SHIELDING SURFACE
62, 62B REAR SURFACE
63, 63B PROTRUSION PORTION
64, 64A, 64B CONCAVE PORTION
81 STEERING WHEEL
82 STEERING SHAFT
82$a$ INPUT SHAFT
82$b$ OUTPUT SHAFT
84 UNIVERSAL JOINT
85 LOWER SHAFT
86 UNIVERSAL JOINT
87 PINION SHAFT
100 STEERING DEVICE
101 STEERING HANDLE
102 RACK HOUSING
103 PINION
104 TIE ROD
105 FEMALE STEERING SHAFT
106 MALE STEERING SHAFT
107 CROSS JOINT
108 INTERMEDIATE SHAFT
109 CROSS JOINT
110 STEERING DEVICE
120 STEERING COLUMN APPARATUS
121 INNER COLUMN
122 OUTER COLUMN
123 TILT BRACKET
1231 VEHICLE BODY MOUNTING SIDE BRACKET
1232 PRESSING BRACKET
124 FIXED BRACKET
125 TELESCOPIC MULTI-PLATE
126 TELESCOPIC MULTI-PLATE
127 TILT LEVER
128 TILT BOLT HOLE
129 TIGHTENING MECHANISM
130 MANIPULATION PORTION
131 ROLLING BEARING
132 TILT BOLT
133 CAM LOCK MECHANISM
134 NUT
135 ROLLING BEARING
136 SEPARATION PREVENTING MECHANISM
137 SHEAR PIN
138 SHEAR PIN
139 INNER COLUMN CONTACT SURFACE

140 SHEAR PIN HOLE
141 SHEAR PIN HOLE
142 FIXED PORTION
143 FIXED PORTION
144 TRANSVERSE BEAM PORTION
145 COLUMN PORTION
146 MOUNTING PORTION
147 DISTANCE BRACKET
148 CAM AND GEAR MECHANISM
149 SHEAR PIN
150 SHEAR PIN
151 MOVABLE GEAR LOCK
152 FIXED GEAR LOCK
153 TILT BOLT CENTER PORTION
154 CAM MECHANISM
155 ECCENTRIC CAM
156 PRESSING BLOCK
157 PRESSING BLOCK
158 INNER PLATE
159 CONCAVE PORTION
160 FITTING PROTRUSION
161 FITTING HOLE
162 INJECTION PORT
BK CUT SURFACE
M CONNECTION MEMBER
P, PA SHEAR PIN
Pi INNER PIN
Pi1 BODY PORTION
Pi2 LARGE DIAMETER PORTION
Pie END
Po, PoA OUTER PIN
Po1 MAIN BODY PORTION
Po2 SEPARATION PREVENTING PORTION
Po3 FLANGE PORTION
Poe END
Poh GUIDE HOLE
Pos NOTCH
Posb FRONT END
pr PROTRUSION
VB VEHICLE BODY

The invention claimed is:

1. A steering device comprising:
an inner column having a cylindrical shape and a first hole opened therein, the inner column rotatably supporting an input shaft connected to a steering wheel;
an outer column having a cylindrical shape into which at least a part of the inner column is inserted and having a slit formed by notching one insertion side end of the inner column;
an outer column bracket fixed to a vehicle body side member so as to support the outer column and to tighten the outer column along with telescopic friction plates having a plate shape;
an inner column bracket having a second hole opened therein, the inner column supported by the telescopic friction plate; and
a connection member provided at a position straddling the first hole and the second hole, and the connection member detachably connecting the inner column and the inner column bracket to each other,
wherein each of the telescopic friction plates are disposed at both sides of the outer column, and
wherein the inner column bracket includes an arm portion connecting the telescopic friction plates disposed at both sides of the outer column, a neck portion projected from the arm portion in a direction perpendicular to the length direction of the arm portion, and a leg portion provided at an end opposite to the arm portion of the neck portion and contacting the inner column.

2. The steering device according to claim 1,
wherein the arm portion includes a curved portion which is curved in a direction approaching the inner column at a position between the neck portion and the telescopic friction plate.

3. The steering device according to claim 1,
wherein the arm portion includes a rib that is projected in a direction perpendicular to an axial direction of the inner column.

4. The steering device according to claim 1,
wherein the leg portion is provided at the front and rear sides of the neck portion in an axial direction of the inner column, and
wherein the first hole and the second hole are provided at front and rear sides of the neck portion in an axial direction of the inner column.

5. The steering device according to claim 1,
wherein each of the telescopic friction plates disposed at both sides of the outer column faces each other with the inner column bracket interposed between the telescopic friction plates, and
wherein the first hole and the second hole are disposed at a position where the distance values from each of the telescopic friction plates facing each other with the inner column bracket interposed between the telescopic friction plates are equal to each other.

6. The steering device according to claim 1,
wherein the outer column is located at a front side of a vehicle body and includes a pivot bracket, and the outer column is formed so that the detached inner column is inserted into the outer column.

* * * * *